(12) United States Patent
Xia et al.

(10) Patent No.: US 12,730,296 B2
(45) Date of Patent: Sep. 8, 2026

(54) REFLECTION MECHANISMS OF MICROSCOPIC IMAGING DEVICES, MICROSCOPIC IMAGING DEVICES AND METHODS THEREOF

(71) Applicant: SHANGHAI RUIYU BIOTECH CO., LTD., Shanghai (CN)

(72) Inventors: Haohan Xia, Shanghai (CN); Wenlong Zhai, Shanghai (CN)

(73) Assignee: SHANGHAI RUIYU BIOTECH CO., LTD., Shanghai (CN)

( * ) Notice: Subject to any disclaimer, the term of this patent is extended or adjusted under 35 U.S.C. 154(b) by 373 days.

(21) Appl. No.: 18/365,202

(22) Filed: Aug. 3, 2023

(65) Prior Publication Data

US 2024/0004180 A1 Jan. 4, 2024

Related U.S. Application Data

(63) Continuation-in-part of application No. PCT/CN2021/135636, filed on Dec. 6, 2021.

(30) Foreign Application Priority Data

Feb. 4, 2021 (CN) ......................... 202110158227.9
Feb. 4, 2021 (CN) ......................... 202120322530.3

(51) Int. Cl.
*G02B 21/36* (2006.01)
*G02B 21/04* (2006.01)
*G02B 21/24* (2006.01)

(52) U.S. Cl.
CPC ........... *G02B 21/365* (2013.01); *G02B 21/04* (2013.01); *G02B 21/241* (2013.01); *G02B 21/361* (2013.01)

(58) Field of Classification Search
CPC .... G02B 21/365; G02B 21/04; G02B 21/241; G02B 21/361; G02B 7/198; G02B 21/00; G02B 21/02; G02B 21/26; G02B 21/36
See application file for complete search history.

(56) References Cited

U.S. PATENT DOCUMENTS 6,859,312 B1 2/2005 Atchison
2011/0235169 A1* 9/2011 Lim ....................... G02B 21/04 359/380

(Continued)

FOREIGN PATENT DOCUMENTS

CN 1885081 A 12/2006
CN 102289064 A 12/2011

(Continued)

OTHER PUBLICATIONS

International Search Report in PCT/CN2021/135636 mailed on Feb. 16, 2022, 7 pages.

(Continued)

*Primary Examiner* — Thanh Luu
*Assistant Examiner* — Mai Thi Ngoc Tran
(74) *Attorney, Agent, or Firm* — Metis IP LLC

(57) ABSTRACT

The embodiments of the present disclosure provide a reflection mechanism of a microscopic imaging device, a microscopic imaging device and a method thereof. The microscopic imaging device includes: a carrier assembly including a carrier table, the carrier table being configured to support a sample to be observe; an imaging assembly configured to obtain a microscopic image of the sample by photographing the sample; wherein the imaging assembly includes a camera unit and a lens unit, the camera unit at least includes a camera, and the lens unit at least includes a lens, and the camera and/or the carrier table is capable of adjusting an object-image distance by moving along an imaging optical path of the imaging assembly, and the lens is capable of (Continued)

adjusting an object distance and an image distance by moving along the imaging optical path.

15 Claims, 10 Drawing Sheets

(56) References Cited

U.S. PATENT DOCUMENTS

| | | | | |
|---|---|---|---|---|
| 2013/0076888 | A1* | 3/2013 | Hibino | G02B 21/365 348/79 |
| 2017/0329118 | A1* | 11/2017 | Sakamoto | G02B 21/367 |
| 2020/0278530 | A1* | 9/2020 | Madar | G02B 21/06 |

FOREIGN PATENT DOCUMENTS

| | | | |
|---|---|---|---|
| CN | 202256862 | U | 5/2012 |
| CN | 102928971 | A | 2/2013 |
| CN | 203365795 | U | 12/2013 |
| CN | 108802990 | A | 11/2018 |
| CN | 209496196 | U | 10/2019 |
| CN | 209867871 | U | 12/2019 |
| CN | 210376866 | U | 4/2020 |
| CN | 210401827 | U | 4/2020 |
| CN | 212255074 | U | 12/2020 |
| CN | 112764211 | A | 5/2021 |
| CN | 214409423 | U | 10/2021 |

OTHER PUBLICATIONS

Written Opinion in PCT/CN2021/135636 mailed on Feb. 16, 2022, 9 pages.

* cited by examiner

REFLECTION MECHANISMS OF MICROSCOPIC IMAGING DEVICES, MICROSCOPIC IMAGING DEVICES AND METHODS THEREOF

CROSS REFERENCE TO RELATED APPLICATIONS

This specification is a continuation in part of International Application No. PCT/CN2021/135636, filed on Dec. 6, 2021, which claims priority to Chinese Patent Application No. 202110158227.9, filed on Feb. 4, 2021 and Chinese Patent Application No. 202120322530.3, filed on Feb. 4, 2021, the entire contents of each of which are hereby incorporated by reference.

TECHNICAL FIELD

The present disclosure relates to the field of microscopic imaging devices, and in particular to reflection mechanisms of microscopic imaging devices, microscopic imaging devices and methods thereof.

BACKGROUND

In the fields of biology, chemistry and so on, microscopic imaging devices are widely used. The microscopic imaging devices are used to magnify samples through objective lens and is convenient for an operator to observe. It is often necessary to change magnification of a microscopic imaging device to observe a same sample.

Therefore, how to be able to change the magnification of the microscopic imaging devices conveniently and quickly is a technical problem that needs to be solved in this field.

SUMMARY

According to one of the embodiments of the present disclosure, a microscopic imaging device is provided, including: a carrier assembly including a carrier table, and the carrier table is configured to support a sample to be observed; and an imaging assembly configured to obtain a microscopic image of the sample by photographing the sample. The imaging assembly includes a camera unit and a lens unit, the camera unit at least includes a camera, and the lens unit at least includes a lens. The camera and/or the carrier table is capable of adjusting an object-image distance by moving along an imaging optical path of the imaging assembly, and the lens is capable of adjusting an object distance and an image distance by moving along the imaging optical path.

According to one of the embodiments of the present disclosure, a microscopic imaging method is provided, and the method is applied to the microscopic imaging device of any of the above technical schemes, including: obtaining the target magnification and a focal length of the lens of the microscopic imaging device; determining, based on the target magnification and the focal length, the object-image distance, the object distance, and the image distance; moving, based on the object-image distance, the camera and/or the carrier table along the imaging optical path to determine a location of the camera and/or the carrier table; moving, based on the object distance and the image distance, the lens along the imaging optical path to determine a location of the lens; and obtaining the microscopic image of the sample by photographing the sample through the imaging assembly.

According to one of the embodiments of the present disclosure, a reflection mechanism for the microscopic imaging device is provided, including: a fixing frame, a lens frame and an adjusting assembly. The lens frame includes a frame body, and the frame body is configured to install a reflecting mirror. The adjusting assembly is configured to connect the lens frame and the fixing frame, adjust a relative location between the lens frame and the fixing frame to adjust a relative angle between the reflecting mirror and the fixing frame.

BRIEF DESCRIPTION OF THE DRAWINGS

The present disclosure is further illustrated in terms of exemplary embodiments, and these exemplary embodiments are described in detail with reference to the drawings. These embodiments are not limiting. In these embodiments, the same number indicates the same structure, wherein.

Figure 1:
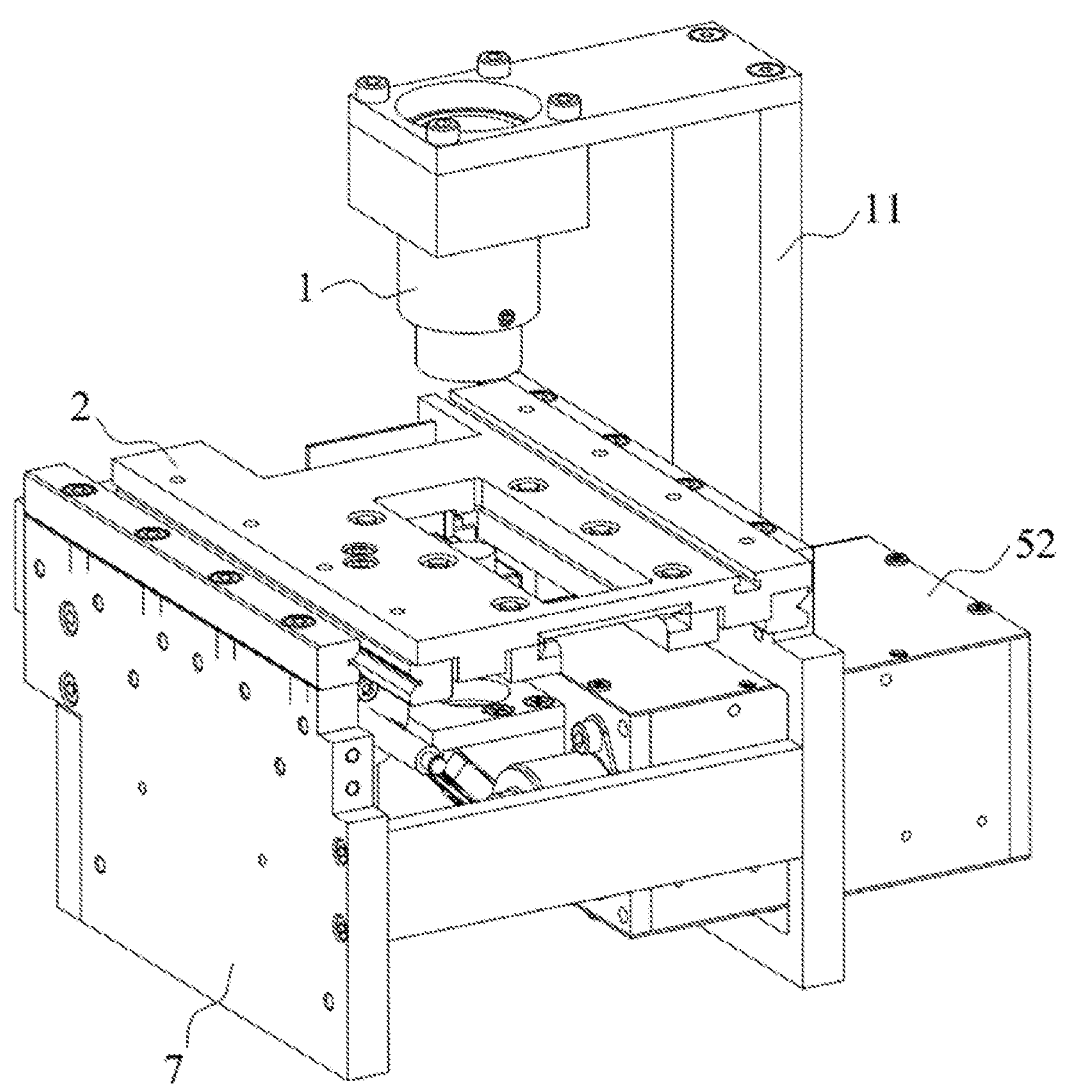
FIG. 1 is a schematic diagram illustrating a structure of a microscopic imaging device according to some embodiments of the present disclosure.

Description of reference numbers in Figures: 1: a light source; 11: a light source support; 2: a carrier table; 21: a first carrier table driving member; 3: a lens; 31: a lens driving member; 32: a connecting plate; 321: a first light-through-hole; 33: a lens fixing frame; 331: a second sliding slot; 4: a reflection mechanism; 41: a fixing frame; 411: an incidence hole; 412: an emergence hole; 413: a threaded hole; 42: a lens frame; 421: an adjusting through-hole; 422: a first accommodating slot; 423: a second accommodating slot; 424: a compression member; 425: an abutting portion; 426: a mounting through-hole; 43: an adjusting bolt; 44: an elastic member; 45: a reflecting mirror; 5: a camera; 51: a camera driving member; 52: a light shielding box; 521: a second light-through-hole; 522: a first sliding rail; 523: a first sliding slot; 53: a camera fixing frame; 61: an actuating connection plate; 611: a fixing plate; 612: a second sliding rail; 621: a third sliding slot; 622: a third sliding rail; 63: a reset member; 64: a stopping member; 7: a gantry.

DETAILED DESCRIPTION

To illustrate the technical solutions of the embodiments of the present disclosure, the accompanying drawings that need to be used in the description of the embodiments would be briefly introduced below. Obviously, the accompanying drawing in the following description is merely some examples or embodiments of the present disclosure, and those skilled in the art may apply the present disclosure to other similar situations according to the drawings without any creative effort. Unless obviously obtained from the context or the context illustrates otherwise, the same numeral in the drawings indicates the same structure or operation.

It will be understood that the terms "system," "device," "unit," and/or "module" used herein are used to distinguish different components, elements, parts, sections, or assemblies of different levels. However, the terms may be disproved by other expressions if they may achieve the same purpose.

As used in the present disclosure and the appended claims, the singular forms "a," "an," and "the" are intended to include plural referents, unless the content clearly dictates otherwise. Generally, the terms "comprise" and "include" only imply that the clearly identified steps and elements are included, but these steps and elements may not constitute an exclusive list, and the method or device may further include other steps or elements.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

A microscope images a sample by magnifying the sample through an objective lens, and it is necessary to change the magnification to observe a same sample when observing using a microscope imaging device. In some embodiments, the purpose of changing the magnification may be achieved by switching objective lenses of different magnifications. However, such type of microscope imaging device cannot continuously change the magnification, which results in an inconvenient observation of an object sample. In some embodiments, a zoom lens having a function of changing the magnification may be used in the microscope to achieve the purpose of changing the magnification. The zoom lens needs to change its structure to realize a change of the magnification, and the structure of the zoom lens is cumbersome. Due to reasons of production process, a shaking or shifting of an image may appear if the zoom lens is used, and it is difficult to ensure a clarity of the image. Operations of the zoom lens is complicated, and a suitable magnification requires a plurality of attempts, which is time-consuming and inconvenient to use.

The embodiments of the present disclosure provide a reflection mechanism of a microscopic imaging device, a microscopic imaging device, and a method thereof. The microscopic imaging device includes a carrier assembly and an imaging assembly. The carrier assembly is configured to support a sample to be observed, and the imaging assembly is configured to obtain a microscopic image of the sample by photographing the sample. A camera of the imaging assembly and/or a carrier table of the carrier assembly is capable of adjusting an object-image distance by moving along an imaging optical path of the imaging assembly, and the lens is capable of adjusting an object distance and an image distance by moving along the imaging optical path. The change of magnification of microscopic imaging device of the present disclosure may be realized by movements of the camera, the carrier assembly, and/or the lens without changing the structure of the lens, thereby simplifying a structure of the lens. Thus, an clarity of imaging does not easy to be affected by a production process. And the microscopic imaging device is compact in structure, thereby improving a practicality and a portability of the microscopic imaging device. In addition, adjusting ranges of an object distance, an image distance, and an object-image distance are enlarged by realizing the change of magnification through the structure, so that an arrangement and adjustment may be conveniently obtained according to a use demand, thereby simplifying the operations of changing the magnification. The microscopic imaging device may be an ordinary optical microscope (which utilizes natural light as a light source), a fluorescence microscope, etc.

Figure 2:
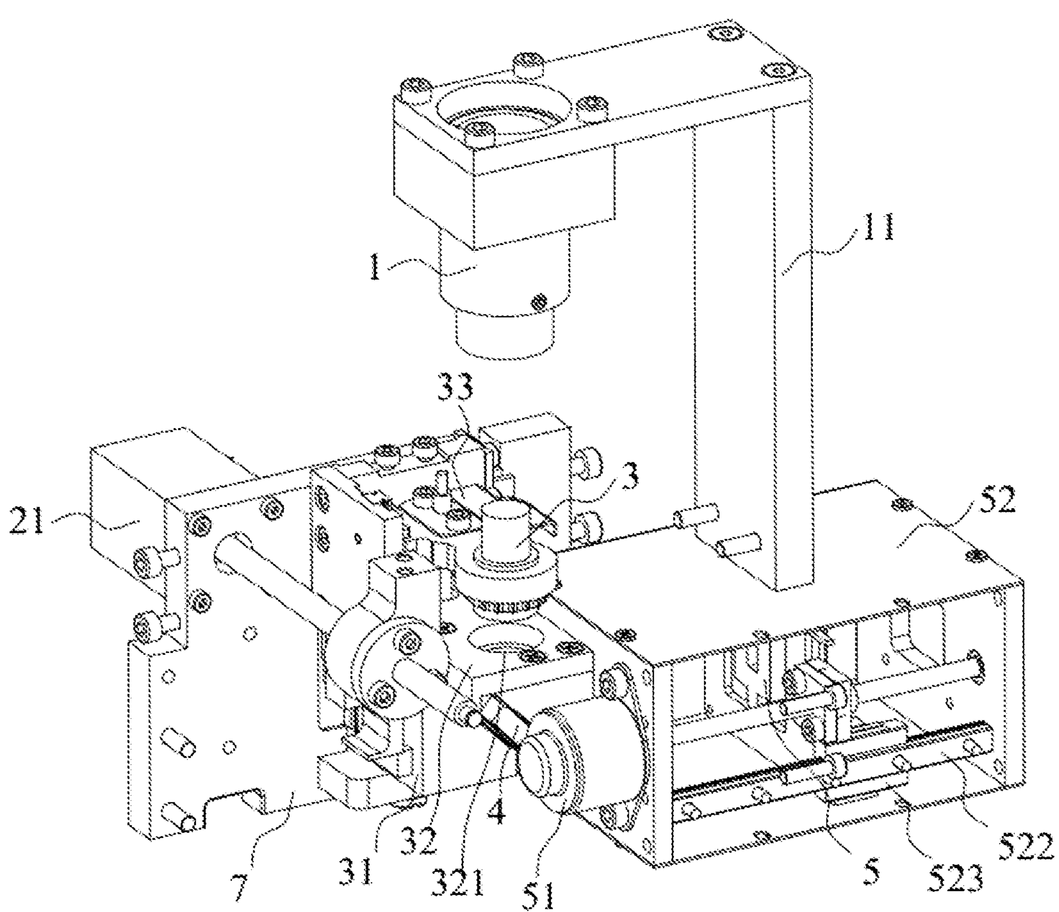
FIG. 2 is a schematic diagram illustrating part of a structure of a microscopic imaging device according to some embodiments of the present disclosure.
Figure 3:
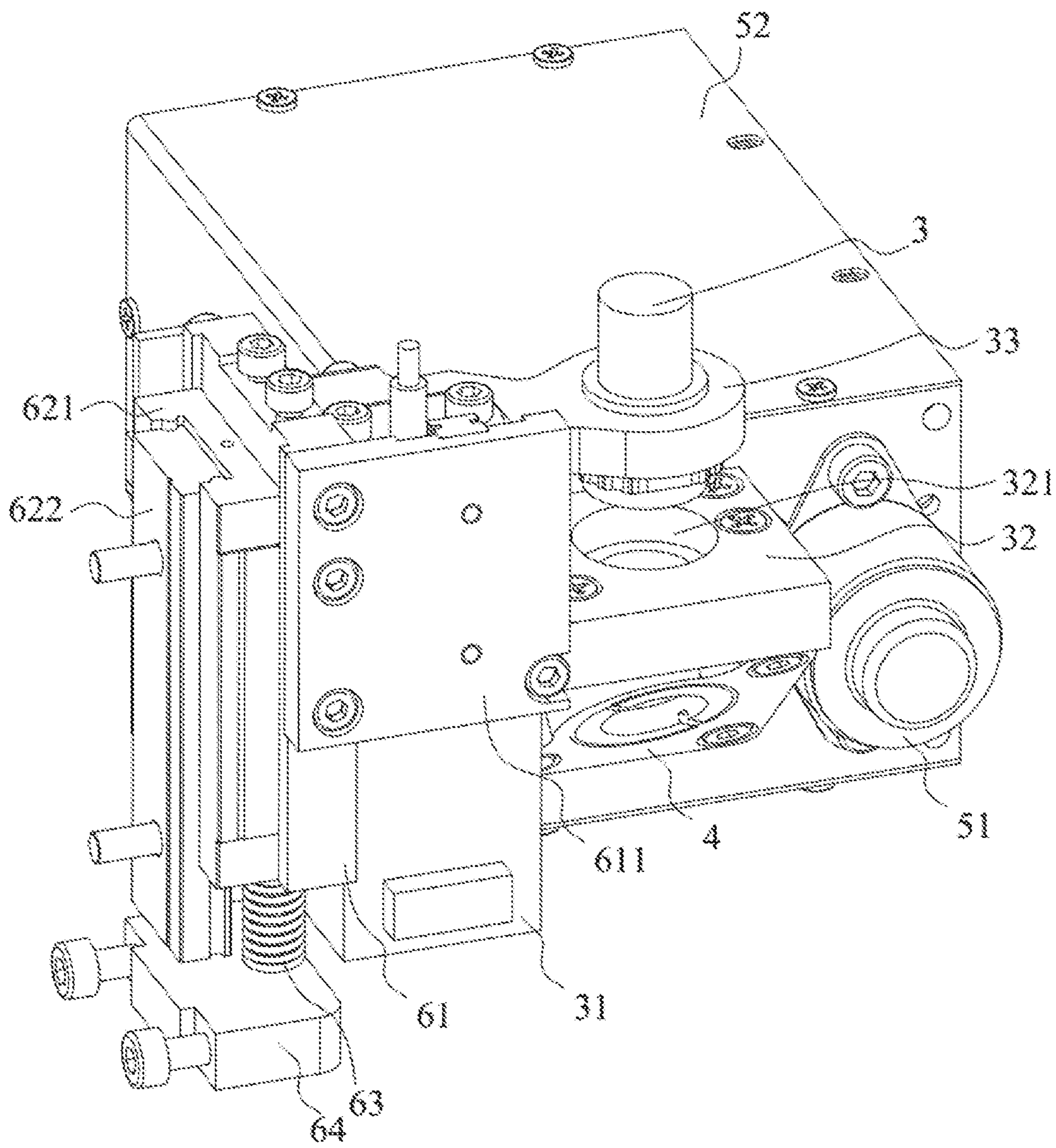
FIG. 3 is a schematic diagram illustrating structures of a actuating assembly, a lens unit, a camera unit, and a reflection mechanism of a microscopic imaging device according to some embodiments of the present disclosure.
Figure 4:
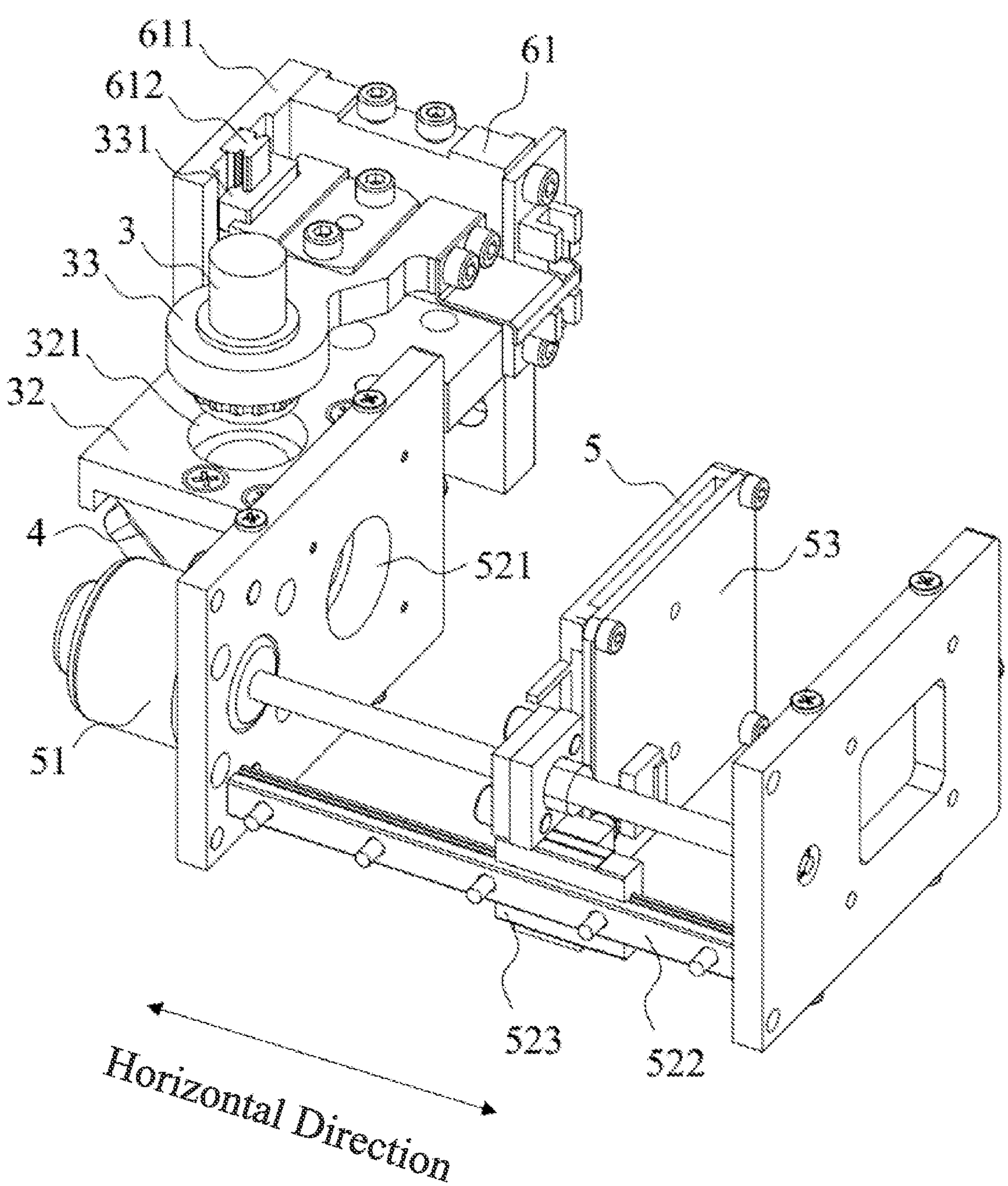
FIG. 4 is a schematic diagram illustrating a structure of FIG. 3 by removing a light shielding box.

FIG. 1 is a schematic diagram illustrating a structure of a microscopic imaging device according to some embodiments of the present disclosure. FIG. 2 is a schematic diagram illustrating part of a structure of a microscopic imaging device according to some embodiments of the present disclosure. FIG. 3 is a schematic diagram illustrating structures of an actuating assembly, a lens unit, a camera unit, and a reflection mechanism of a microscopic imaging device according to some embodiments of the present disclosure. FIG. 4 is a schematic diagram illustrating a structure of FIG. 3 by removing a light shielding box. The microscopic imaging device involved in the embodiments of the present disclosure will be described in detail in the following in conjunction with FIG. 1-FIG. 4. It should be noted that the following embodiments are merely provided for the purpose of explaining the present disclosure, and do not limit the present disclosure.

As shown in FIG. 1-FIG. 4, a microscopic imaging device includes a carrier assembly configured to support a sample to be observed and an imaging assembly configured to photograph and image the sample. The carrier assembly may include a carrier table 2, and the carrier table 2 may be configured to support the sample to be observed. The imaging assembly may be configured to obtain a microscopic image of the sample by photographing the sample. The imaging assembly may include a camera unit and a lens unit. The camera unit includes at least a camera 5. The camera 5 is configured to image the sample to obtain a microscopic image of the sample. In some embodiments, the camera 5 may be a CCD camera or a CMOS camera. The lens unit includes at least a lens 3. In some embodiments, the lens 3 may be a macro lens, a wide-angle lens, a telephoto lens, and the like. In some embodiments, the camera and/or the carrier table 2 may move along an imaging optical path of the imaging assembly to adjust an object-image distance, and the lens 3 may be move along the imaging optical path to adjust an object distance and an image distance, thereby realizing a target magnification of the microscopic imaging device.

The imaging optical path of the imaging assembly may be understood as a propagation path of light during an imaging process of the imaging assembly. The imaging optical path extends from the carrier 2 through the lens 3 and into the camera 5. In some embodiments, the lens 3 may be located between the carrier table 2 and the camera 5. Understandably, a relative positions of the lens 3, the carrier table 2, and the camera 5 may be arranged in a variety of ways to realize imaging, only if it is ensured that the imaging optical path extends from the carrier table 2 through the lens 3 and into the camera 5.

It should be noted that the object-image distance is a distance between an object surface of the sample and a light-sensitive surface of the camera 5. The distance between the carrier 2 and the camera 5 is adjustable, such that the distance between the object surface of the sample and the light-sensitive surface of the camera 5 (i.e., the object distance) is adjustable. An adjustment of the object-image distance may be achieved by moving the camera 5 along the imaging optical path, by moving the carrier table 2 along the imaging optical path, or by moving the camera 5 and the carrier table 2 simultaneously (e.g., moving the camera 5 and the carrier table 2 relative to each other or back-to-back). The object distance is a distance between an object surface of the sample facing the lens 3 and the lens 3, and the image distance is a distance between the lens 3 and the light-sensitive surface of the camera 5. The distance between the lens 3 and the carrier table 2 may be changed by moving the lens 3 along the imaging optical path, thereby adjusting the object distance. The distance between the lens 3 and the camera 5 may also be changed by moving the lens 3 along the imaging optical path, thereby adjusting the image distance.

In some embodiments, the magnification is related to the object distance, the image distance, the object-image distance, and a focal length of the lens 3. In some embodiments, after determining the target magnification and the focal length of the lens 3, the object distance, the image distance, and the object-image distance may be determined based on the target magnification and the focal length of the lens 3. In some embodiments, a relationship between the magnification, the object distance, the image distance, the object-image distance, and the focal length of the lens 3 may be illustrated by the following equation: $1/f=1/u+1/v$, $m=v/u$, and $d=u+v$, where f is the focal length of the lens 3, m is the target magnification; v is the image distance; u is the object distance; and d is the object-image distance. Therefore, when the focal length f is constant, an image distance value, an object distance value, and an object-image distance value may be determined based on the above three equations while selecting one target magnification. The image distance v, the object distance u, and the object-image distance d may be adjusted to the above values correspondingly by moving the camera 5 and/or the carrier table 2 and the camera 5 along the imaging optical path, so that an actual magnification of the microscopic imaging device reaches the above target magnification.

In some embodiments, the object-image distance may be adjusted by first moving the camera 5 and/or the carrier table 2, and then the object distance and the image distance may be adjusted by moving the lens 3. Understandably, when the carrier table 2 is stationary and the camera 5 moves along the imaging optical path, the object-image distance changes, and if the lens 3 is stationary at that time, then the image distance also changes. When the carrier 2 and the camera 5 are both stationary, the object-image distance remains unchanged, and if the lens 3 moves along the imaging optical path at this time, the object distance and the image distance change.

The change of magnification of the microscopic imaging device is realized by the movement of the lens 3 along the imaging optical path and the adjustment of the distance between the carrier table 2 and the camera 5, which improves a clarity of an image captured by the camera 5 and simplifies the operations of changing the magnification. In some embodiments, the magnification refers to an optical magnification. If a variable magnification lens is used, a magnification change range of the variable magnification lens is small, usually around 4 to 5 times, which makes it difficult to meet the observation requirements of the sample (e.g., it is difficult to obtain more detailed image information of the sample, or a detection of a survival rate is not accurate at low magnification). Cost of the microscopic imaging device of the present disclosure is low, the magnification change range is relatively large, and a maximum magnification may be 10 times or more. The microscopic imaging device of the present disclosure does not change the magnification by changing the structure of the lens 3. The microscopic imaging device of the present disclosure simplifies the structure of the lens 3, thereby simplifying the structure of the microscopic imaging device, improving a compactness of the microscopic imaging device in structure, improving a practicality and a portability of the microscopic imaging device, simplifying an internal structure of the microscopic imaging device, expanding a range of adjustment of the object distance and the image distance, and expanding a scope of application of the microscopic imaging device.

In some embodiments, the camera unit further includes a camera driving member 51, and the camera driving member 51 is configured to drive the camera 5 to move along the imaging optical path. In some embodiments, the lens unit further includes a lens driving member 31, and the lens driving member 31 is configured to drive the lens 3 to move along the imaging optical path. In some embodiments, the carrier assembly further includes a second carrier table driving member (not shown in the figure), and the second carrier table driving member is configured to drive the carrier table 2 to move along the imaging optical path. Positions of the lens 3, the camera 5, and the carrier table 2 may be adjusted conveniently and accurately by providing the lens driving member 31, the camera driving member 51, and/or the second carrier table driving member, so that the magnification of the microscopic imaging device may be conveniently and accurately transformed. In some embodiments, the lens driving member 31 may include a second screw motor as described below, and the camera driving member 51 may include a third screw motor as described below. Specific descriptions regarding the lens driving member 31, the camera driving member 51, and the second carrier driving member may be found related descriptions below.

In some embodiments, the lens 3, the camera 5, and/or the carrier 2 may be manually moved by an operator of the microscopic imaging device. In some embodiments, the camera unit may include a tripod of the camera 5, a track provided on the tripod of camera 5, and rollers capable of rolling along the track, the rollers are rotatably provided on the camera 5. With this arrangement, the camera 5 may move along the track by rolling the rollers along the track. A movement distance of the camera 5 on the track may be controlled manually by an operator of the microscopic imaging device. In some embodiments, a locking device may be provided between the camera 5 and the tripod of the camera 5 to fix the relative location of the camera 5 to the tripod of camera 5. Similarly, the lens 3 and the carrier 2 may be arranged in a similar process to realize a manual movement of the position, which will not be repeated herein.

In some embodiments, the microscopic imaging device further includes a controller. The controller is configured to control the camera driving member 51, the lens driving member 31, and/or the second carrier table driving member to control the camera 5, the lens 3, and/or the carrier table 2 to move. In some embodiments, the controller is connected to the camera driving member 51 through a signal, and the controller is configured to control the camera driving member 51 to drive the camera 5 to control the movement distance of the camera 5 to adjust the object distance. In some embodiments, the controller is connected to the second carrier table driving member through the signal, and the controller is configured to control the second carrier table driving member to drive the carrier table 2 to move to control the moving distance of the carrier table 2, thereby adjusting the object-image distance. In some embodiments, the controller is connected to the lens driving member 31 through the signal, and the controller is configured to control the lens driving member 31 to drive the lens 3 to move to control the moving distance of the lens 3, thereby adjusting the object distance and the image distance. The controller is connected to the components of the microscopic imaging device (e.g., the lens driving member 31, the camera driving member 51, and/or the second carrier table driving member). It is understood that the above components and the controller are capable of interacting with each other of data or signal, to allow the controller to perform automatic control on the lens driving member 31, the camera driving member 51, and/or the second carrier table driving member. By providing the controller, a degree of automatic of the microscopic imaging device may be increased and a convenience of using the microscopic imaging device may be improved. In other embodiments, the camera driving member 51, the lens driving member 31, and the second carrier table driving member may be controlled through the operator of the microscopic imaging device.

In some embodiments, the microscopic imaging device further includes a light source 1, the light source 1 is configured to irradiate the sample, and an optical path of light emitted from the light source forms the imaging optical path. A brightness of the imaging at the camera 5 may be improved by providing the light source 1, thereby ensuring the clarity of the image and facilitating observation. Understandably, the optical path of light emitted from the light source 1 passes through the sample and the lens 3 in turn and reaches the camera 5. The light source 1 and the lens 3 may be provided on the carrier table 2 to both sides respectively. In some embodiments, the light source 1 may be an LED lamp, a halogen lamp, a UV lamp, and the like.

In some embodiments, the carrier table 2 is provided with a sample placement hole for placing the sample, and the sample placement hole is provided opposite the light source 1 and the lens 3, so that light emitted from the light source 1 is capable of passing through the sample placement hole, the sample, and the lens 3, and ultimately reaches the camera 5. In some embodiments, the carrier assembly may further include a sample fixture provided on the carrier table 2 configured to fix the sample on the carrier table 2.

In some embodiments, the microscopic imaging device may further include a gantry 7. The carrier table 2, the lens unit, and the camera unit may all be provided on the gantry 7. In some embodiments, the gantry 7 may also be provided with a light source support 11, and the light source 1 is fixed to the light source support 11 and provided on one side of the carrier table 2. In some embodiments, the carrier table 2 is arranged horizontally and located on a top surface of the gantry 7. In some embodiments, the light source support 11 may be L-shaped, and the light source support 11 may include a vertical plate and a horizontal plate, a bottom end of the vertical plate may be fixedly connected to the gantry 7, and a top end of the vertical plate may be connected to the horizontal plate. The top end of the vertical plate extends towards top of the carrier table 2 and is fixed to the light source 1. In some embodiments, the light source 1 may be provided above the carrier table 2, the lens 3 may be provided below the carrier table 2, and the imaging optical path between the lens 3 and the light source 1 extends in a vertical direction. In other embodiments, the light source 1 may also be provided below the carrier table 2, and the lens 3 and the camera 5 may be provided above the carrier table 2. In some embodiments, the vertical plate of the light source support 11 may further be a retractable structure to adjust the distance between the light source 1 and the sample. In some other embodiments, the light source support 11 may be provided with a sliding rail, the light source 1 may be provided with a slider rail, and the slider may slide along the sliding rail to drive the light source 1 to slide on the light source support 11, thereby adjusting the distance between the light source 1 and the sample.

Figure 5:
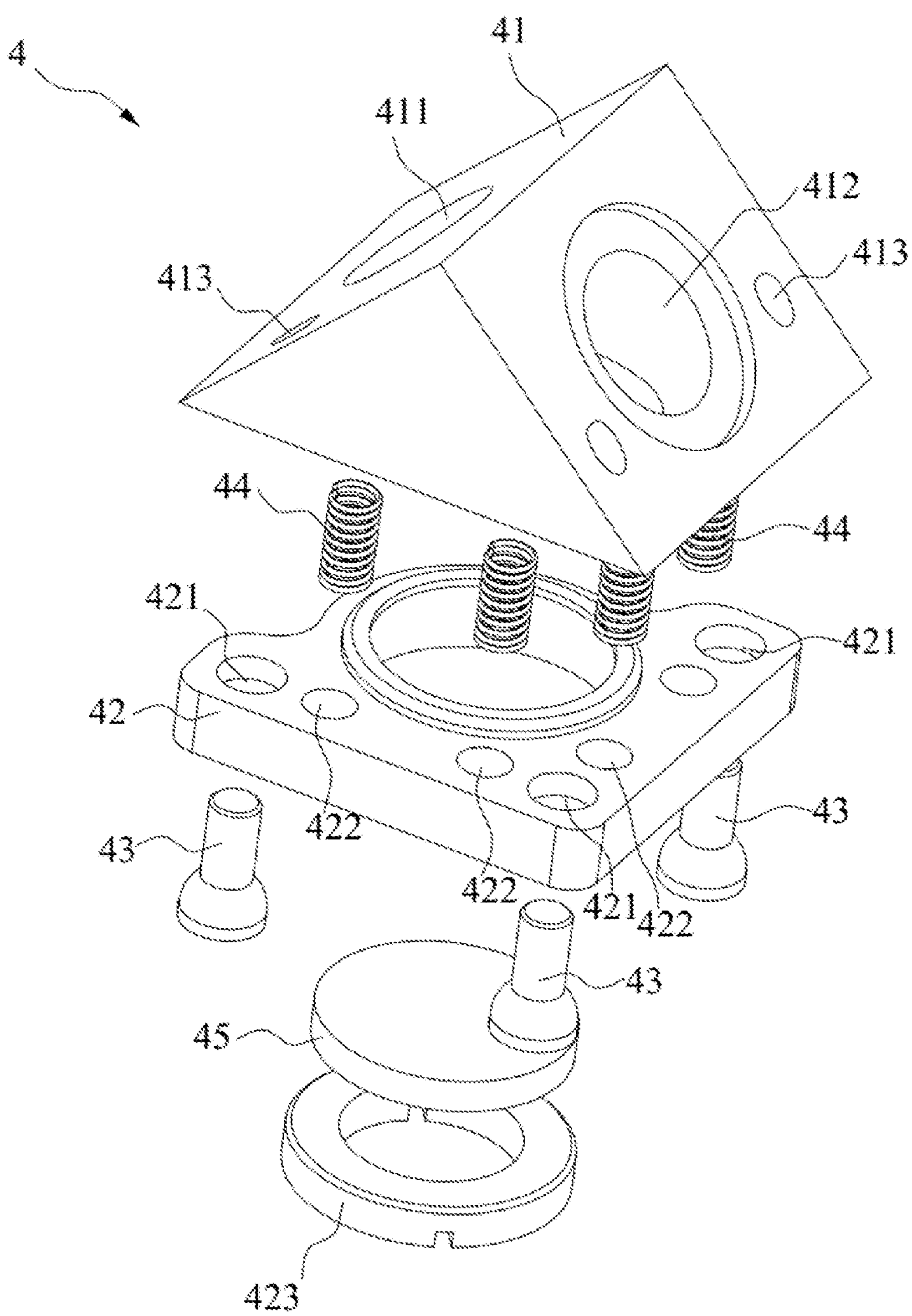
FIG. 5 is an exploded diagram illustrating a reflection mechanism according to some embodiments of the present disclosure.

In some embodiments, the microscopic imaging device further includes a reflection mechanism 4. FIG. 5 is an exploded diagram illustrating a reflection mechanism according to some embodiments of the present disclosure. As shown in FIG. 5, the reflection mechanism 4 includes a reflecting minor 45, and the reflecting minor 45 is configured to change an irradiation direction of light on the imaging optical path between the lens 3 and the camera 5. The reflecting mirror 45 is provided on an imaging optical path between the lens 3 and the camera 5. The direction of the imaging optical path may be changed by providing the structure of the reflecting mirror 45, a length dimension of the microscopic imaging device may be shortened, and the compactness of the microscopic imaging device may be improved. A mirror plane where a plane of the reflecting minor 45 is located is at a certain angle (e.g., at an angle of 30°, 60°, etc.) to light rays of the imaging optical path incident on the reflecting minor 45 An angle between the minor plane where the plane of the reflecting mirror 45 is located and the light rays of the imaging optical path incident to the reflecting minor 45 is related to the relative positions of the lens 3 and the camera 5, and the reflecting minor 45 needs to allow the light rays of the imaging passing through the lens 3 to be incident into the camera 5. In some embodiments, the light rays of the imaging optical path passing through the lens 3 extend in a vertical direction, the light rays of the imaging optical path passing through the lens 3 is reflected by the reflecting mirror 45, and may be emitted in a horizontal direction to reach the camera 5. In some other embodiments, the microscopic imaging device may be simplified by not providing a reflection mechanism if there is no form factor requirement.

In some embodiments, the reflection mechanism 4, the camera unit, and the lens unit are provided on the gantry 7. In some embodiments, the reflection mechanism 4 further includes a fixing frame 41 and an adjusting assembly, and the fixing frame 41 is fixed to the gantry 7. The reflecting mirror 45 is installed on the fixing frame 41 by the adjusting assembly, and the adjusting assembly is capable of adjusting the angle of the reflecting minor 45 relative to the fixing frame 41. The angle of the reflecting mirror 45 relative to the fixing frame 41 is the angle between the plane where the mirror plane of the reflecting minor 45 is located and a bottom plane of the fixing frame 41. Further descriptions regarding the adjusting assembly may be found in the related descriptions below.

Referring to FIG. 5, in some embodiments, the fixing frame 41 includes a housing, and the reflecting minor 45 is connected to the housing. The housing is provided with an incidence hole 411 and an emergence hole 412, and the adjusting assembly is capable of adjusting an angle of the reflecting minor 45 relative to the fixing frame 41, so that the imaging optical path may be incident to the reflecting mirror 45 from the incidence hole 411. The imaging optical path is reflected by the reflecting mirror 45, and the reflected imaging optical path is emitted from the emergence hole 412 to reach the camera 5. An arrangement of the adjusting assembly may adjust the angel of the reflecting minor 45 according to an actual situation of the imaging optical path, thereby ensuring the imaging optical path to reach the camera 5 along a preset direction, avoiding factors such as assembly errors of the reflecting mirror 45 affecting the angle of the reflected light, and improving an imaging effect. In some embodiments, the adjusting assembly is configured to adjust the angle of the reflecting minor 45 relative to the fixing frame 41 to ensure that the imaging optical path in the vertical direction may be emitted in the horizontal direction to reach the camera 5 after being reflected by the reflecting mirror 45. In some embodiments, the housing of the fixed frame 41 may be a shape of triangular prism with a right-angled cross-section. The incident hole 411 is opened on a first side wall corresponding to one of right edges, and the emergence hole 412 is formed on a second side wall corresponding to the other right edge. The mirror 45 may be located on a third side wall corresponding to a hypotenuse. Further descriptions regarding the fixing frame 41 may be found in related descriptions below.

In some embodiments, the microscopic imaging device further includes a lens frame 42, the lens frame 42 is configured to support the reflecting mirror 45. The lens frame 42 includes a frame body, and the reflecting mirror 45 may be mounted on the frame body. The adjusting assembly may be connected to the lens frame 42 and the fixing frame 41, and the adjusting assembly may be configured to adjust the relative angle between the lens frame and the fixing frame. Further descriptions regarding the lens frame 42 may be found in the related descriptions below.

In some embodiments, the adjusting assembly includes a reflecting mirror driving member, and the reflecting mirror driving member is configured to drive the reflecting mirror 45 to rotate relative to the fixing frame 41. In other embodiments, the reflecting mirror 45 may be mounted on the lens frame 42, and the reflecting mirror driving member is configured to drive the lens frame 42 to rotate relative to the fixing frame 41. In some embodiments, the reflecting mirror 45 may be rotationally connected (e.g., articulated) to the fixing frame 41. In some embodiments, the reflecting mirror driving member of the adjusting assembly may include a motor, an engine, etc. In other embodiments, the reflecting mirror driving member may include a plurality of linear motors arranged at intervals, the linear motors may be fixed to the fixing frame 41, and the outputs of the linear motors may be connected to the lens frame 42 (e.g., bottom of the lens frame 42).

In some embodiments, the reflecting mirror driving member is connected to a controller through the signal. The controller may be configured to perform the operations, including: controlling the imaging assembly to obtain at least one test image; determining one or more test parameters based on the at least one test image, and the one or more test parameters are configured to reflect imaging quality of the at least one test image; determining a preset rotation direction of the reflecting mirror 45 and a preset rotation angle of the reflecting mirror 45 based on the one or more test parameters; and controlling the reflecting mirror driving member to drive the reflecting mirror 45 to rotate based on the preset rotation direction and the preset rotation angle. When the reflecting mirror driving member includes a motor, the controller may control the rotation direction and the rotation angle of the motor to allow the motor to drive the reflecting mirror 45 to rotate relative to the fixing frame 41 according to the preset rotation direction and the preset rotation angle. When the reflecting mirror driving member includes the plurality of linear motors arranged at intervals, the controller may control the angle of the lens frame 42 relative to the fixing frame 41 by controlling a protrusion of an output end of each linear motor.

In some embodiments, the one or more test parameters may include a grayscale value of a plurality of preset regions of the test image. In some embodiments, the one or more test parameters include a standard deviation of gray values of the plurality of preset regions of the test image and/or an average of the gray values of the plurality of preset regions of the test image. In some embodiments, the one or more test parameters may include a cell viability of the plurality of preset regions of the test image. In some embodiments, the one or more test parameters may include a standard deviation of the cell viability of the plurality of preset regions of the test image and/or the average of the cell viability of the plurality of preset regions of the test image. The plurality of preset regions may be a plurality of regions arranged at intervals on the test image. The plurality of preset regions are a plurality of regions of equal area. Merely by way of example, the plurality of preset regions may include four regions located at each of four corners of a rectangular test image.

In some embodiments, the preset rotation angle of the reflecting mirror 45 and the preset rotation angel of the reflecting mirror 45 may by determined by a adjusting personnel of the microscopic imaging device based on one or more test parameters. Merely by way of example, the one or more test parameters include the grayscale values of four regions located at the four corners of the rectangular test image. The preset rotation direction may be a direction that causes a grayscale value of a region with the smallest grayscale value to increase while causing the grayscale values of the four regions to be substantially equal. A preset rotation angle may be set to 0.1°, 0.2°, 0.5°, or 1°, and the like. The adjusting personnel may rotate the preset rotation angle at one time in the preset rotation direction to ultimately make the grayscale values of the four regions equal. In some embodiments, determining the preset rotation direction and the preset rotation angle of the reflecting mirror 45 based on the test parameters may include: determining the preset rotation direction of the reflecting mirror 45 and the preset rotation angle of the reflecting mirror 45 based on the one or more test parameters by using a trained machine learning model. In some embodiments, the one or more test parameters may be input as features within a machine learning model, and the machine learning model may output data such as the preset rotation direction and the preset rotation angle based on input features. In some embodiments, the above machine learning model may include, but is not limited to, a neural network model (e.g., a (Convolutional Neural Networks model, a Deep Neural Network model), a Support Vector Machine model, a Lambdarank model, a LambdaMart model, a GBDT+LR model, and the like.

In some embodiments, whether to adjust the reflecting minor 45 may be determined based on a result of comparing the standard deviation of the gray values of the plurality of preset regions of the test image with a preset threshold value. Merely as way of example, when the standard deviation of the gray values of the plurality of preset regions is greater than the preset threshold value, the reflecting mirror 45 is adjusted. In some embodiments, determining the preset rotation direction of the reflecting mirror 45 based on the one or more test parameters may be performed according to the following operations, including: comparing the gray values of various preset region of the test image with the average value of the gray values of the plurality of preset regions, and arranging the preset rotation direction of the reflecting mirror 45 to the direction corresponding to a preset region whose gray value differs more from the average of the gray values of the plurality of preset regions. In some embodiments, a preset rotation angle may be set in advance. For example, the preset rotation angle 0.1°, 0.2°, 0.5°, 0.8°, or 1°, and the like. A test image may be taken after each rotation of the preset rotation angle along the preset rotation direction, and the adjustment of the reflecting minor 45 may be further performed based on the one or more test parameters of the test image. In other embodiments, the preset rotation angle may be determined based on a difference between a grayscale value of each preset region and an average value of grayscale values of the plurality of preset regions. If the difference is large, the preset rotation angle is set large (e.g., 0.8° or 1°, etc.), and if the difference is small, the preset rotation angle is set small (e.g., 0.1° or 0.2°, etc.).

In some embodiments, the preset rotation direction of the reflecting minor and the preset rotation angle of the reflecting minor are further related to a light reflectivity, an environment light intensity, and the one or more test parameters. For different angles and different directions corresponding to the minors and different light intensities, the light reflectivity is different and thus a reflected light intensity is different.

In some embodiments, the reflecting minor may be configured as a reflecting mirror with adjustable reflectivity. Exemplarily, the reflecting mirror may include a multi-layer structure, where each single layer may have a different reflectivity. For example, a surface of each single layer is coated with a different material. In some embodiments, the reflectivity of the reflecting minor may be a reflectivity corresponding to a single layer located in an outermost layer. In some embodiments, the reflecting mirror may have an effective position capable of providing a reflection effect, and a holding position configured to accommodate the multi-layer structure, and a reflectivity of the reflecting mirror may be a reflectivity of the single layer located at an effective position. In some embodiments, each single layer may be separately connected to a micro-motor, the micro-motor may be connected to the controller through the signal, and the controller may control each single layer to move through the micro-motor, for example, to the outermost layer of the reflecting mirror, or to the effective position.

In some embodiments, the controller may evaluate a light reflection effect based on a candidate rotation direction, a candidate rotation angle, a candidate light reflectivity, the environment light intensity, and the one or more test parameter of the reflecting mirror; and determine the preset rotation direction of the reflecting minor and the preset rotation angle of the reflecting mirror based on the light reflection effect.

In some embodiments, the light reflection effect may be evaluated based on a plurality of feasible approaches, e.g., evaluated by manual experience, evaluated by a preset algorithm, etc. In some embodiments, the controller may evaluate the light reflection effect based on the candidate rotation direction, the candidate rotation angle, the candidate light reflectivity, the environment light intensity, and the one or more test parameter of the reflecting mirror through an evaluation model. The evaluation model may be a machine learning model. The evaluation model may include, but is not limited to, a neural network model (e.g., a CNN model, a DNN model), and the like.

In some embodiments, an input of the evaluation model includes the candidate rotation direction, the candidate rotation angle, the candidate light reflectivity, the environment light intensity, and the one or more test parameter of the reflecting mirror, and an output of the evaluation model includes an effect score. The candidate rotation direction of the mirror includes a plurality of rotation directions, which may be randomly generated or manually selected based on experience. The candidate rotation angle may include a plurality of rotation angles, which may be randomly generated or manually selected based on experience. And the candidate light reflectivity may include the reflectivity corresponding to each single layer in the multi-layer structure of the minor, which may be obtained based on experimental testing of the reflectivity of each single layer. The environment light intensity refers to a light intensity of the environment where the mirror is located, which may be measured by a light intensity meter. The effect score refers to a score of the light reflection effect. The higher the score, the better the reflection effect of the reflecting mirror on the light. The test parameter may be found in above descriptions.

In some embodiments, the evaluation model may be obtained by training a plurality of training samples having labels. In some embodiments, a training sample at least includes a sample rotation direction, a sample rotation angle, a sample reflectivity, a sample environment light intensity, and a sample test parameter of the reflecting mirror. The training samples may be obtained through historical data. Labels may be an effect scores corresponding to a sample condition, and the labels may be determined under sample conditions based on subsequent observed images. In some embodiments, the label may be determined by a first parameter and a second parameter, e.g., determined by a degree of difference in cell viability at the first magnification and the second magnification, and if the difference is great, the effect score is small. The first parameter and the second parameter may be found in related descriptions below.

In some embodiments, the controller determines a preset rotation direction and a preset rotation angle of the reflecting mirror based on the light reflection effect, which may include: selecting the candidate rotation direction of the reflecting mirror and the candidate rotation angle of the reflecting minor corresponding to the largest of the effect scores outputted by the evaluation model as the preset rotation direction of the reflecting minor and the preset rotation angle of the reflecting mirror. In some embodiments, the candidate light reflectivity corresponding to the largest of the effect scores output by the evaluation model may also be selected as the preferred reflectivity, and the controller may adjust the reflectivity of the reflecting mirror to a preferred reflectivity.

It should be noted that only some of the contents of the reflection mechanism 4 are described above, and other related descriptions regarding the reflection mechanism 4 (e.g., the specific structure of the fixing frame 41, the lens frame 42, the adjusting assembly, and the other components of the reflection mechanism 4) may be found in related descriptions of FIG. 5-FIG. 9 below.

By providing the reflection mechanism 4, a structure of the microscopic imaging device is simplified, a space occupation is reduced, a size of the microscopic imaging device is favored to be reduced, and a compactness of the microscopic imaging device is improved.

In some embodiments, the second carrier table driving member is configured to drive the carrier table 2 ascend or descend, i.e. drive the carrier table 2 along the imaging optical path. By driving the carrier table 2 along the imaging optical path, a range of adjustment of the image distance is extended. In some embodiments, the second carrier table driving member may include a first screw motor. In some other embodiments, the second carrier table driving member may also be a cylinder, a motor, a hydraulic cylinder, etc. It may be understood that when the image distance is adjusted, both the second carrier table driving member and the camera driving member 51 may be activated, or only one of the second carrier table driving member and the camera driving member 51 may be activated for the purpose of changing the object distance. Similarly, when it is necessary to change the object distance and the image distance, the carrier table 2 and the camera 5 may be fixed and the object distance and the image distance may be changed only by adjusting the lens 3, or the object distance and the image distance may also be changed by simultaneously adjusting the carrier table 2, the lens 3, and the camera 5.

In some embodiments, the carrier table 2 is provided with carrier table 2 slots, such as two carrier table 2 slots provided in parallel, and the gantry 7 is provided with two sliding rails of the carrier table 2, such as two sliding rails of the carrier table 2 provided in parallel. The sliding slot of the carrier table 2 and the sliding rail carrier table 2 may both be provided along a horizontal plane, with the two 2 slots sliding of carrier table one-to-one with the two sliding rails of the carrier table 2. In some embodiments, the microscopic imaging device may further include a first carrier table driving member 21. The first carrier table driving member 21 drives the carrier table 2 in a plane perpendicular to the imaging optical path. The first carrier table driving member 21 may include a first screw motor, the first screw motor being fixed to the gantry 7. The first screw motor is connected to the carrier table 2 and is capable of driving the carrier table 2 in a plane perpendicular to the imaging optical path. For example, the first screw motor is capable of driving the carrier table 2 in a horizontal plane. In other embodiments, the first carrier table driving member 21 may include a cylinder, an electric cylinder, a hydraulic cylinder, etc. In some embodiments, two first screw motors may be provided, and the driving directions of the outputs of the two first screw motors are perpendicular to each other in the horizontal plane, thereby expanding the range of location adjustment of the load carrier 2. The setting of the first carrier table driving member 21 facilitates observation of different positions of the sample, improves the utility of the device, reduces the count of times the operator touches the sample, and reduces the influence of human factors on the sample.

In some embodiments, the lens driving member 31 may include a second screw motor. The second screw motor is capable of driving the lens 3 for changing the object distance and the image distance. The second screw motor may be fixed to the gantry 7, and an output end of the second screw motor may be connected to the lens 3 and be able to drive the lens 3 along the imaging optical path, which means that the second screw motor is able to drive the lens 3 in a vertical direction to adjust the length of the imaging optical path between the lens 3 and the sample. In some other embodiments, the lens driving member 31 may include a cylinder, an electric cylinder, a hydraulic cylinder, etc.

In some embodiments, the camera driving member 51 may include a third screw motor. The third screw motor is capable of driving the camera 5 to move for changing the object-image distance. An output end of the third screw motor is connected to the camera 5, and is capable of driving the camera 5 to move along the imaging optical path. The imaging optical path passes through lens 3 and is incident the reflective mirror 45 (such as an imaging optical path extending along the vertical direction), and after being reflected by the mirror 45, the light is incident to the camera 5 (along the horizontal direction). That is, the imaging optical path between the camera 5 and the reflecting minor 45 is in a horizontal direction, and the third screw motor is capable of driving the camera 5 in the horizontal direction. In some other embodiments, the camera driving member 51 may include a cylinder, an electric cylinder, a hydraulic cylinder, etc.

In some embodiments, the lens unit includes a lens fixing frame 33 that is horizontally provided, the lens fixing frame 33 is in a shape of a plate. One end of the lens fixing frame 33 is opened with a fixing hole of the lens 3, and an outer wall of a lens barrel of the lens 3 is fixed in the fixing hole of the lens 3, and the output end of the second screw motor may be fixed to the other end of the lens fixing frame 33, by which the lens 3 may be driven to move in a vertical direction. In some embodiments, the lens unit may further include a first displacement sensor, and the first displacement sensor may be on the lens fixing frame 33 for detecting a distance moved by the lens fixing frame 33 to drive the lens 3. In some embodiments, a first displacement sensor may be a photoelectric sensor, a Hall sensor, or the like.

In some embodiments, as shown in FIG. 4-FIG. 5, the lens unit may also be provided with a connecting plate 32. A connecting plate 32 is configured to be connect to the fixing frame 41 for positioning the reflection mechanism. The connecting plate 32 is provided with a first light-through-hole 321, the lens 3 is spaced apart from one side of the connecting plate 32, and the fixing frame of the reflection mechanism 4 is fixedly connected to the other side of the connecting plate 32. The imaging optical path is capable of reaching the reflecting minor 45 through the first light-through-hole 321 and the incidence hole 411 in sequence after passing through the lens 3. The reflection mechanism 4 and the lens unit are fixedly connected to the connecting plate 32 through the fixing frame 41, which facilitates the positioning of the reflection mechanism, improves a degree of modularity within the microscopic imaging device, facilitates the assembly, and saves assembly time. In some embodiments, the connecting plate 32 extends horizontally and is connected to the gantry 7 to one side, the first light-through-hole 321 is opened on the other side of the connecting plate 32, an axis of the first light-through-hole 321 is in the vertical direction, the lens fixing frame 33 is arranged at intervals on top of the connecting plate 32 and the fixing hole of the lens 3 is provided opposite to the first light-through-hole 321. In some embodiments, a first sidewall of the fixing frame and the connecting plate 32 may be connected by bolts. The second screw motor may be fixed at bottom of the connecting plate 32, and the output end of the second screw motor may pass through the connecting plate 32 and is connected to the lens fixing frame 33.

In some embodiments, the camera unit further includes a light shielding box 52. The light shielding box 52 is at least used to accommodate the camera 5. The light shielding box 52 is provided with a light-through-hole, and a fixing frame is connected to an outer wall of the light shielding box 52. The imaging light is reflected by the reflecting minor 45 and then sequentially passes through the emergence hole 412 and the light-through-hole to reach the camera 5. By providing the light shielding box 52, an influence of external light on the imaging of the camera 5 is avoided, the imaging quality is improved, and a stable imaging of the microscopic imaging device is ensured. In some embodiments, the camera driving member 51 may also be provided in the light shielding box 52.

In some embodiments, the light shielding box 52 may be rectangular in shape, and an axial direction of a second light-through-hole 521 may be along the horizontal direction, such as a direction indicated by the arrow in FIG. 4, which is also an illumination direction of the light of the imaging optical path of the structure shown in FIG. 4. In some embodiments, the camera unit may further include a plate-like camera fixing frame 53, and the camera 5 may be fixed to the camera fixing frame 53. A camera driving member 51 (e.g., the third screw motor) may be fixed to the housing of the light shielding box 52, and the camera driving member 51 (e.g., the third screw motor) may pass through the light shielding box 52 and be connected to the camera fixing frame 53, and drive the camera 5 to move through the camera fixing frame 53. In some embodiments, the light shading box 52 may be provided with a first sliding rail 522, the first sliding rail 522 may be provided in a horizontal direction. The camera fixing frame 53 may be provided with a first sliding slot 523, and the first sliding slot 523 and a first sliding rail 522 may slide and fit with each other. In some embodiments, the camera unit may further include a second displacement sensor, the second displacement sensor is fixed on the camera fixing frame 53 or inside the shade box 52 for detecting a moving distance of the camera driven by the camera fixing frame 53. The first sliding rail 522 and the first sliding slot 523 may play a guiding role during a movement of the camera 5 to prevent a movement direction of the camera 5 from running off. In some other embodiments, other structures capable of playing the guiding role may be provided between the camera fixing frame 53 and the light shielding box 52. In some embodiments, the second displacement sensor may be a photoelectric sensor, a Hall sensor, and the like.

In some embodiments, a second sidewall of the fixing frame of the reflection mechanism 4 is connected to the light shielding box 52, and the emergence hole 412 is provided opposite to the second light-through-hole 521. The reflection mechanism 4 and the camera unit are fixedly connected to the light shielding box 52 through the fixing frame, which facilitates positioning of the camera unit, improves the degree of modularity within the device, facilitates assembly, and saves the assembly time. In some embodiments, the lens unit, the reflection mechanism 4, and the camera unit are connected sequentially, with a compact structure and a high degree of modularity, which also facilitates a determination of an installation position, reduces the assembly time and reduces the cost.

In some embodiments, the microscopic imaging device further includes an actuating assembly. The lens unit is fixedly connected to the actuating assembly, and the actuating assembly is capable of driving the lens unit, the camera unit, and the reflection mechanism 4 towards or away from the sample simultaneously. In some embodiments, it is necessary to move the carrier table 2 in a plane perpendicular to the imaging optical path (e.g., horizontally) to obtain images at different locations of the sample. However, since a carrier consumable carrying the sample is usually injection molded, an injection molding process may result in the bottom of the carrier consumable not being flat enough, or an optimal location for imaging of the sample located at different positions of the carrier consumable may not be consistent due to errors brought about by the manual assembly process. In other words, when the carrier table 2 is moved in a plane perpendicular to the imaging optical path to photograph the samples in a new field of view, the distance between the samples in the new field of view and the lens 3 may be different from the distance between the samples in an old field of view and the lens 3 due to an error in a flatness at bottom of the carrier consumable, thereby resulting in a change in the object distance. Based on the above reason, to ensure an observation effect and avoid changes in distances between various units or mechanisms (such as the lens unit, the camera unit, the reflection mechanism, etc.) after adjusting the magnification ratio according to the target, thereby avoiding changes in the object distance between the lens 3 and the sample when moving the carrier table 2 in the plane perpendicular to the imaging optical path, the actuating assembly may be used to simultaneously bring the lens unit, the camera unit, and the reflection mechanism close to the sample or move them away from the sample. This eliminates the need to adjust each unit or mechanism individually, and directly brings the lens unit, the camera unit, and the reflection mechanism closer to or away from the sample, thereby enhancing a practicality of the microscope imaging device. In some embodiments, the light source 1 is provided above the carrier table 2, the carrier consumable is provided on an upper surface of the carrier table 2, and the carrier consumable may be in the form of a sheet or a cup.

Referring to FIG. 3-FIG. 4, in some embodiments, the actuating assembly includes an actuating connecting plate 61 and a guiding rod, the guiding rod is fixedly provided and provided through the actuating connecting plate 61, the actuating connecting plate 61 is capable of sliding along the guiding rod, and the lens unit is fixed on the actuating connecting plate 61. In some embodiments, since the lens unit, the camera unit, and the reflection mechanism 4 are connected sequentially, and the lens unit is fixed to the actuating connecting plate 61, which realizes a simultaneous movement of the lens unit, the camera unit, and the reflection mechanism 4 when the actuating connecting plate 61 is moved. In some embodiments, a blind hole is provided at one end of the actuating connecting plate 61, and the guiding rod is provided in the blind hole, thereby making the actuating connecting plate 61 to slide along the guiding rod. Further, the guide rod is provided in a vertical direction and the bottom of the guide rod is connected to the gantry 7, that is, the guide rod is fixedly provided through the gantry 7. In addition, the connecting plate 32 of the lens unit is fixedly connected to the actuating connecting plate 61.

In some embodiments, a stopping member 64 and a reset member 63 are provided at the bottom of the guide rod, the stopping member 64 is fixed to the guide rod, the reset member 63 is sleeved to the guide rod. The bottom end of the reset member 63 is abut against the stopping member 64 and the top end of the reset member 63 is abut against the actuating connecting plate 61. The stopping member 64 is in the form of a block, and the stopping member 64 is fixed to the bottom end of the guide rod and is removably connected to the gantry 7. In some embodiments, the reset member 63 is a spring. In some other embodiments, the reset member 63 may be a structure such as a rubber ring.

In some embodiments, the actuating connecting plate 61 is connected to a fixed plate 611, the fixed plate 611 is provided with a second sliding rail 612, the second sliding rail 612 is provided in a vertical direction. The lens fixing frame 33 is provided with a second sliding slot 331, and the second sliding slot 331 slides and cooperates with the second sliding rail 612. The arrangements of the second sliding slot 331 and the second sliding rail 612 improves a precision of the movement of the lens 3 along the imaging optical path and ensures a functionality of the microscopic imaging device. In addition, the actuating connecting plate 61 is provided with a third sliding slot 621, and the gantry 7 is fixedly provided with a third sliding rail 622, the third sliding rail 622 is provided in a vertical direction, and the third sliding slot 621 slides and cooperates with the third sliding rail 622. The third sliding slot 621 and the third sliding rail 622 are provided to ensure that the actuating assembly is only capable of driving the lens unit, the camera unit, and the reflection mechanism 4 closer to or further away from each other along the vertical direction, thereby preventing the observation field of view from deviating.

In some embodiments, a modulation transfer function of the lens 3 is greater than or equal to 0.05. In some embodiments, a modulation transfer function of the lens 3 is greater than or equal to 0.1. In some embodiments, a modulation transfer function of the lens 3 is greater than or equal to 0.15. The modulation transfer function of the lens 3 is a performance parameter reflecting imaging quality of the lens 3, which may reflect a reproduction capability of the lens 3 on the real world. The modulation transfer function value of lens 3 is affected by the object distance, the magnification, a lens material, and other factors. By selecting a lens 3 with the modulation transfer function within the above range, the imaging quality of the microscopic imaging device may be ensured as much as possible. The modulation transfer function is a function that analyzes the imaging effect of the lens at different spatial frequencies, and the effectiveness may be reflected by the modulation transfer function value. A spatial frequency may be a count of times a physical quantity (such as the brightness of an image) periodically changes within a unit spatial distance, and the unit of the spatial frequency may be lp/mm. Merely way of example, when an object-image distance is 70 mm, a magnification is about 4 times, and a spatial frequency is 250 lp/mm, a modulation transfer function value of the lens 3 may be 0.16. When an object-image distance is 90 mm, a magnification is 6 times, and a spatial frequency is 250 lp/mm, a modulation transfer function value of lens 3 may be 0.17. When an object distance is 110 mm, a magnification is 8 times, and a spatial frequency is 250 lp/mm, a modulation transfer function value of lens 3 may be 0.18. It is necessary to explain that the above are merely exemplary lens modulation transfer function values for different object distances, different magnifications, and different spatial frequencies, and do not constitute a limitation of the present disclosure. The modulation transfer function value of the lens may also change based on other parameters of the lens as described below.

In some embodiments, the microscopic imaging device further includes an input assembly (not shown in the figure), the input assembly is connected to the controller through the signal, the input assembly is configured to input relevant information, and the relevant information is either the target magnification or other information that the input is capable of obtaining or reflecting the target magnification. The input assembly is signal-connected to the controller with the understanding that the input assembly and the controller are capable of interacting with each other in terms of data or signals.

In some embodiments, the input assembly includes a display operating screen, and the display operating screen is configured to input the target magnification. An operator may enter the magnification through the display operating screen to cause the controller to control the individual driving members to drive the individual components to move to achieve the target magnification. In other embodiments, the input assembly may include a keyboard, a voice input device, etc., or any combination thereof.

In some embodiments, the target magnification may be automatically determined based on the sample. For example, an identification (symbol, number, QR code, etc.) on the sample may be scanned, and the target magnification information is determined according to the identification. As another example, a sample to be observed and a cell diameter of the sample may be obtained, and the target magnification may be determined based on the cell diameter.

In some embodiments, the microscopic imaging device further includes the housing, the controller is provided inside the housing, and the display operation screen is provided outside the housing. The first screw motor, the second screw motor, the third screw motor, and a fourth screw motor are all electrically connected to the controller, and the controller is capable of controlling the movement of the first screw motor, the second screw motor, the third screw motor, and the fourth screw motor to adjust the distance between the lens 3, the camera 5, and the carrier table 2 along the imaging optical path after an operator has entered the magnification through the input assembly. Before starting to use the microscopic imaging device or after using the microscopic imaging device, the first screw motor movement may also be controlled by the controller to move the carrier table 2 along a direction perpendicular to the imaging optical path to realize placing or retrieving the sample. The input assembly, the first screw motor, the second screw motor, the third screw motor, and the fourth screw motor and the controller may be wired signal connections or wireless signal connections.

Figure 6:
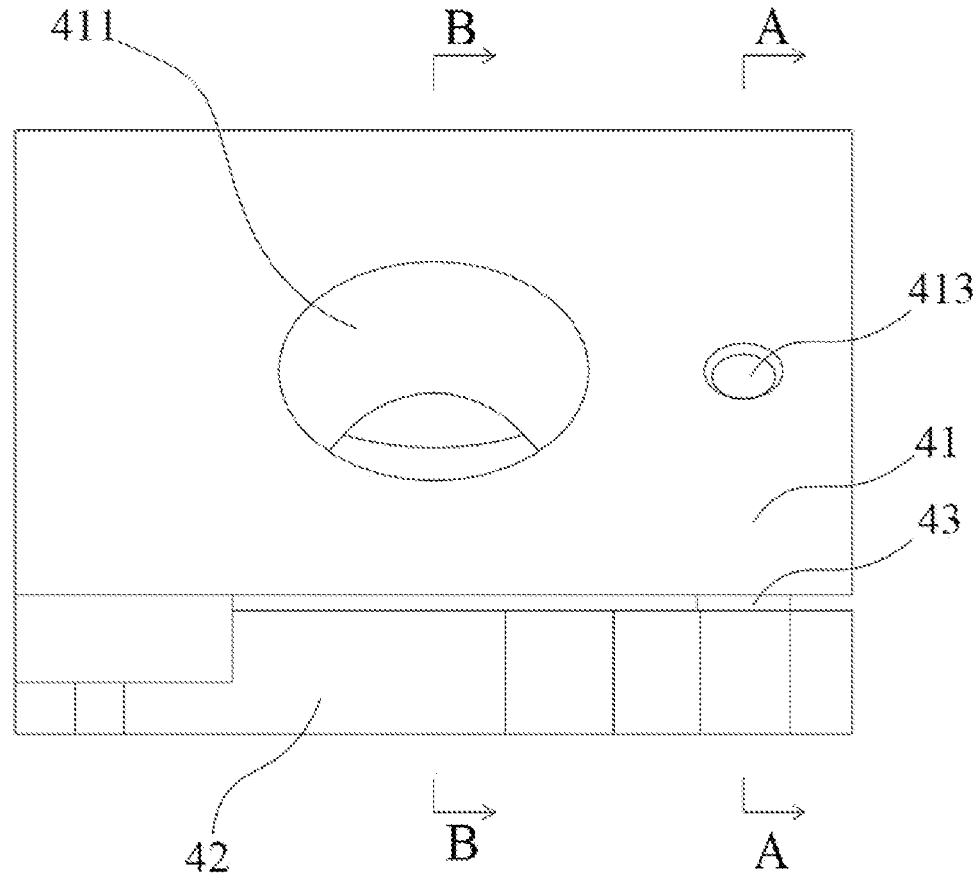
FIG. 6 is a schematic diagram illustrating a structure of a reflection mechanism according to some embodiments of the present disclosure.
Figure 7:
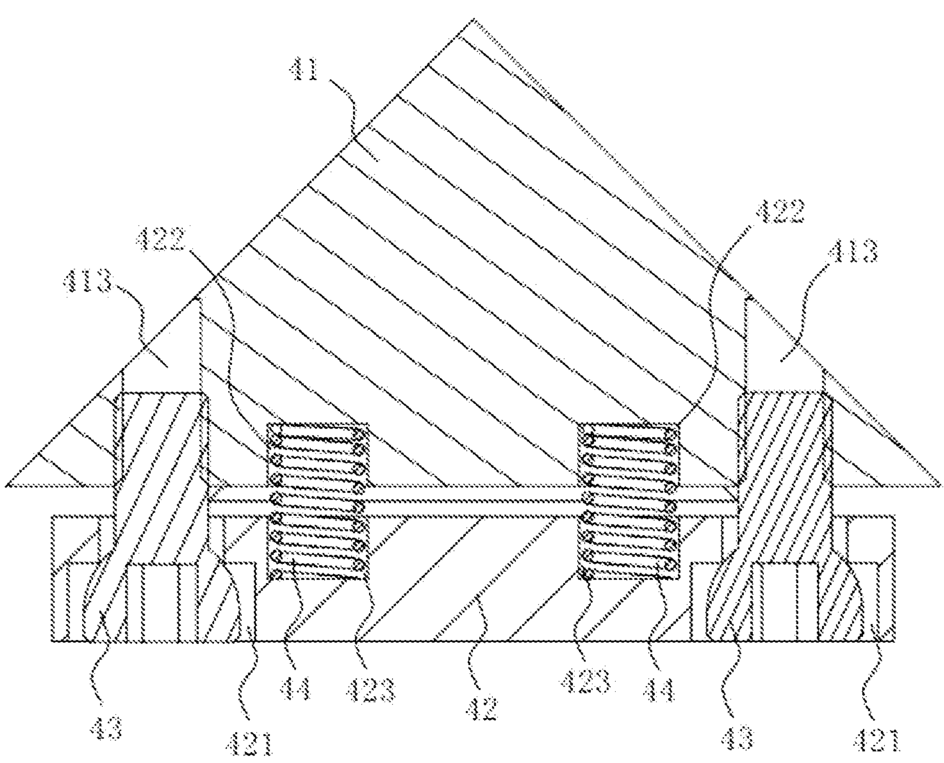
FIG. 7 is an A-A direction sectional diagram illustrating a reflection mechanism according to FIG. 6.
Figure 8:
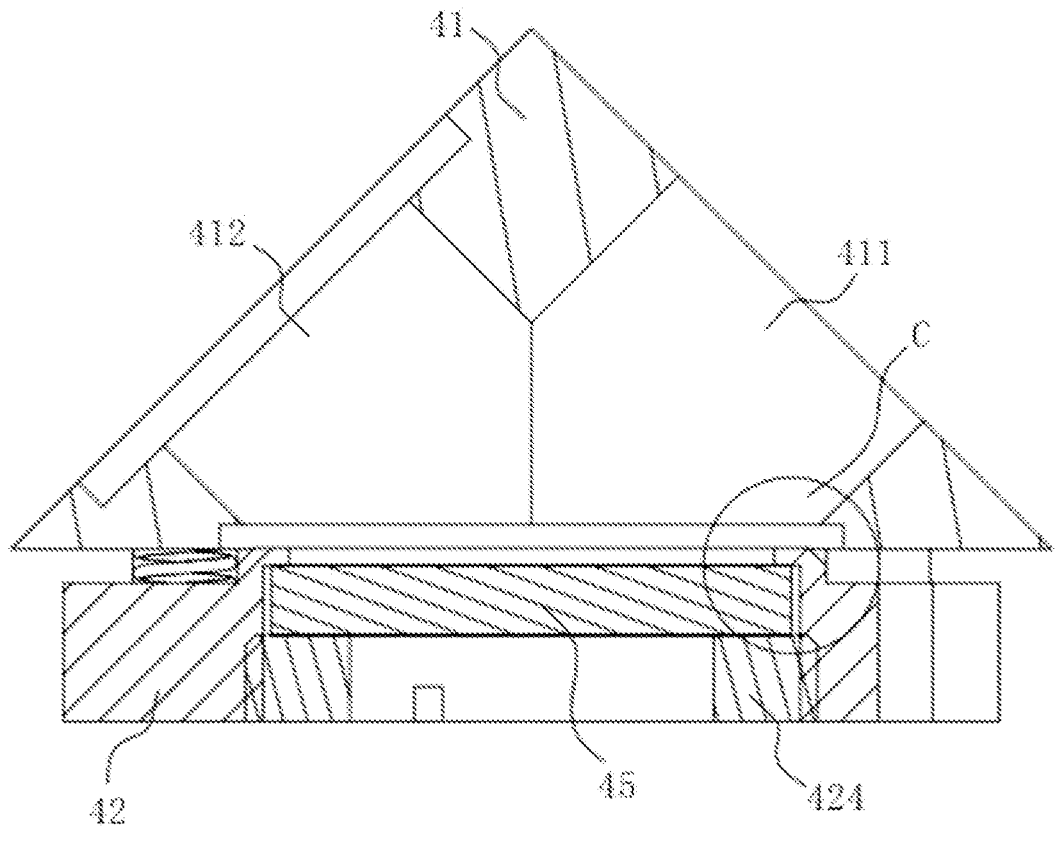
FIG. 8 is a B-B direction sectional diagram illustrating a reflection mechanism according to FIG. 6.
Figure 9:
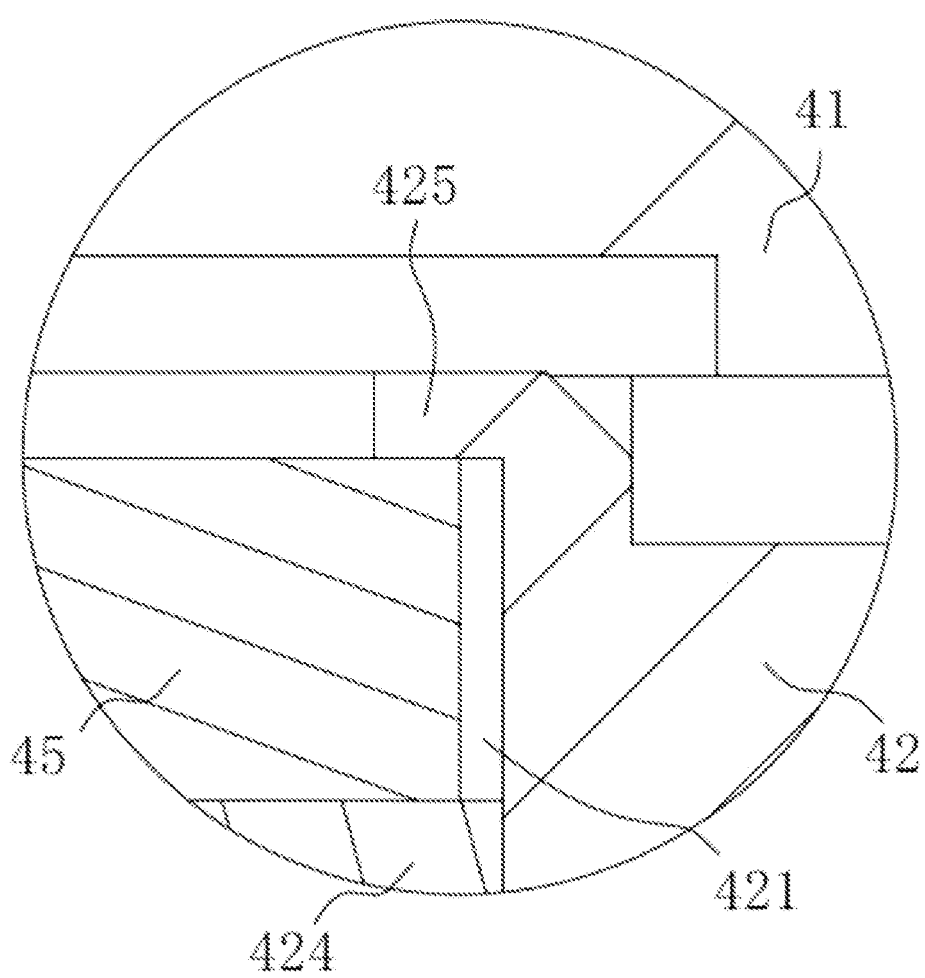
FIG. 9 is a partially enlarged diagram at C in FIG. 8.
Figure 10:
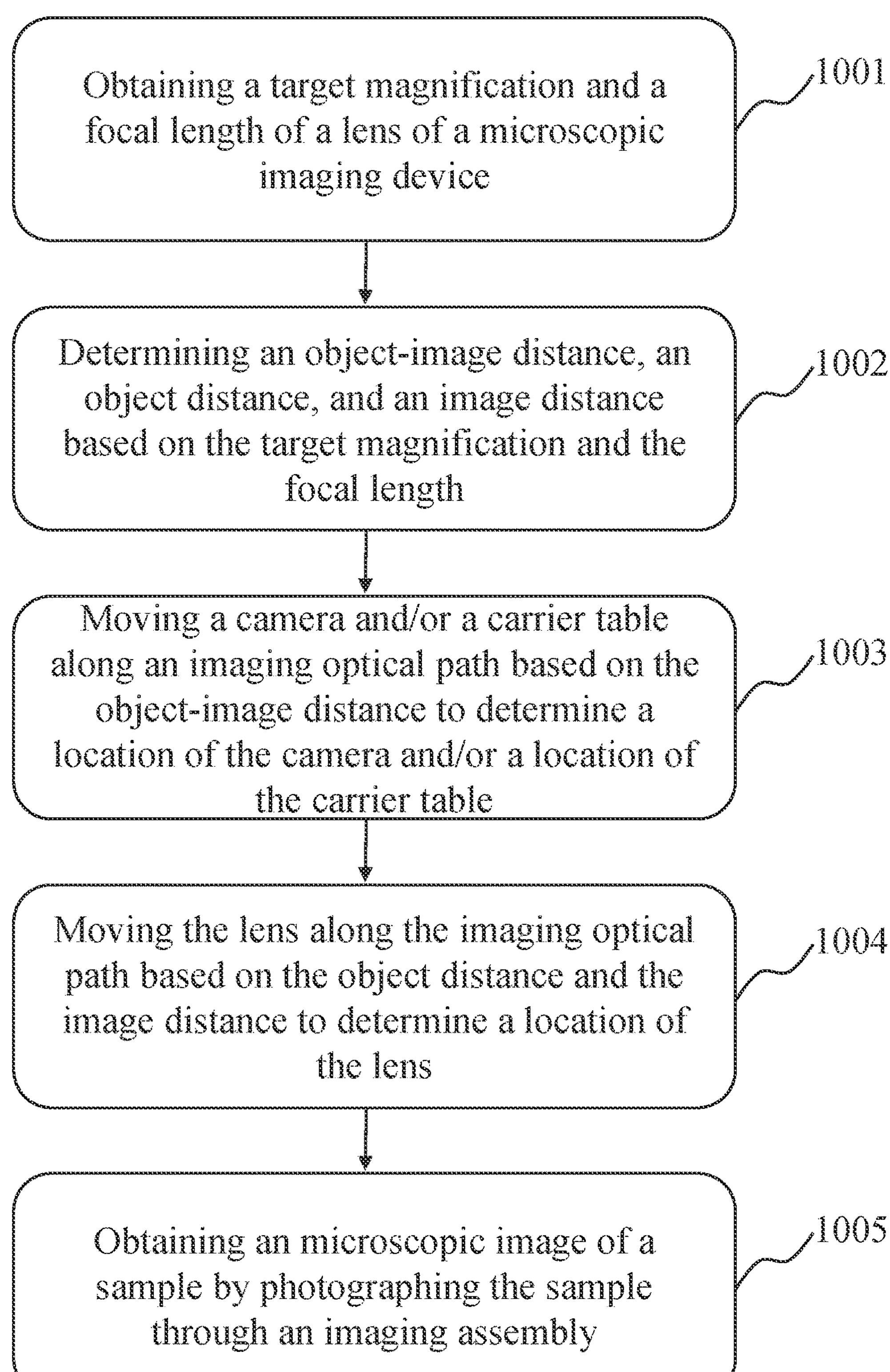
FIG. 10 is a flowchart illustrating a microscopic imaging process according to some embodiments of the present disclosure.

The embodiments of the present disclosure also provide the reflection mechanism 4 for the microscopic imaging device. FIG. 5 is an exploded view of the reflection mechanism 4 according to some embodiments of the present disclosure. FIG. 6 is a schematic diagram illustrating a structure of a reflection mechanism according to some embodiments of the present disclosure. FIG. 7 is an A-A direction sectional diagram illustrating a reflection mechanism according to FIG. 6. FIG. 8 is a B-B direction sectional diagram illustrating a reflection mechanism according to FIG. 6. FIG. 9 is a partially enlarged diagram at C in FIG. 8. As shown in FIG. 5-FIG. 9, the microscopic imaging device further includes a reflection mechanism 4, the reflection mechanism 4 includes a reflecting mirror 45. The reflecting minor 45 is configured to change an irradiation direction of the light in the imaging optical path between the lens 3 and the camera 5. The reflection mechanism 4 includes the fixing frame 41, the lens frame 42, and the adjusting assembly. The lens frame 42 includes a frame body, and the frame body is configured to mount the reflecting mirror 45. The adjusting assembly connects the lens frame 42 and the fixing frame 41. The adjusting assembly is configured to adjust a relative location of the lens frame 42 and the fixing frame 41 to adjust a relative angle of the reflecting minor 45 and the fixing frame 41.

The lenses may be fixed to the lens frame 42 in a plurality of approaches. In some embodiments, the lens frame 42 may be provided with a lens frame, and the lens frame may be configured to accommodate the glasses of lens. In some embodiments, the lens frame 42 may be provided with a slot, and lenses may be stuck in the slot. In some embodiments, as shown in FIGS. 5, 8, and 9, the lens frame 42 may include a mounting through-hole 426, an abutting portion 425, and a compression member 424. The mounting through-hole 426 is provided on the frame body. The abutting portion 425 is provided on an inner wall of the mounting through-hole 426.

The compression member 424 is connected to the frame body and fixes the reflecting mirror 45 between the compression member 424 and the abutting portion 425. The abutting portion 425 may limit the reflecting mirror 45 and prevent the reflecting minor 45 from detaching from the mounting through-hole 426, thereby ensuring the functionality of the reflection mechanism 4. In some embodiments, the reflecting minor 45 may be cylindrical, elliptical columnar, rectangular, etc. or other irregular shapes. In some embodiments, the shape of the mounting through-hole 426 may be consistent with the shape of the reflecting mirror 45.

In some embodiments, the abutting portion 425 is annular in shape, and the abutting portion 425 is provided along a circumferential direction of the inner wall of the mounting through-hole 426. It may be understood that the abutting portion 425 may be circular, elliptical, rectangular, etc., or other irregular annular shape, and the shape of the abutting portion 425 may be adapted to the shape of the mounting through-hole 426. In other embodiments, the abutting portion 425 may be one or more tabs provided on an inner wall of the mounting through-hole 426.

In some embodiments, the mounting through-hole 426 is a threaded hole 413, and the compression member 424 is provided with external threads, and the compression member 424 is threaded onto the mounting through-hole 426. The compression member 424 is capable of compressing the reflecting mirror 45 against the abutting portion 425 after being screwed into the mounting through-hole 426. With this setup, the reflecting mirror 45 may be more easily and stably mounted on the lens frame 42. In other embodiments, the compression member 424 may be provided with a first through-hole and the abutting portion 425 may be provided with a second through-hole, and the compression member 424 and the abutting portion 425 may be connected through a nail or a bolt passing through the first through-hole and the second through-hole.

In some embodiments, as shown in FIG. 5, FIG. 8, and FIG. 9, the compression member 424 may include a snap ring. The snap ring may be provided on one side of the reflecting mirror 45 that is backward to the abutting portion 425. The snap ring is provided with external threads and is capable of being threadedly connected to the mounting through-hole 426. The reflecting mirror 45 may be fixed to the mounting through-hole 426 by the snap ring and the snap ring is threadedly connected to the mounting through-hole 426, which is easy to dismantle and install and is also favorable for an operation of pressing the reflecting mirror 45 against the abutting portion 425 also simplifies the structure, saves the space, and improves the compactness of the structure.

In some embodiments, as shown in FIG. 5 and FIG. 7, the adjusting assembly further includes an adjusting through-hole 421, a threaded hole 413, and an adjusting bolt 43. The adjusting through-hole 421 is provided on the lens frame 42, and is provided in the threaded hole 413 on the fixing frame 41, and the adjusting bolt 43 is capable of passing through the adjusting through-hole 421 and being connected to the threaded hole 413. In some embodiments, the adjusting through-hole 421 may be the threaded hole 413. By adopting a bolt to realize the adjustment angle, the structure is simplified, the space is saved, and the compactness of the structure is improved. In some embodiments, the count of adjusting through-holes 421, the threaded holes 413, and adjustment bolts 43 may be more than one, and the plurality of adjusting through-holes 421 may correspond to the plurality of threaded holes 413, and the plurality of adjusting through-holes 421 may correspond to the plurality of adjustment bolts 43. In other embodiments, the count of adjusting through-holes 421 and/or threaded holes 413 may be more than the count of adjustment bolts 43. In some embodiments, the plurality of mounting through-holes 426 may be provided at a periphery of the mounting through-holes 426 and equally spaced along the periphery of the mounting through-holes 426. In some embodiments, the adjustment bolts 43 may be provided in three along the periphery of the mounting through-holes 426. Correspondingly, the count of the threaded holes 413 and the count of the adjusting through-holes 421 are also three.

In other embodiments, the adjusting assembly may include a plurality of linear motors that are arranged at intervals. The plurality of linear motors may be fixed to the fixing frame 41, and the outputs of the plurality of linear motors may all be connected to the lens frame 42 (e.g., the bottom of the lens frame 42). The angle of the lens frame 42 relative to the fixing frame 41 may be controlled by controlling an outreach of the output end of the various linear motors.

In some embodiments, as shown in FIG. 5 and FIG. 7, the fixing frame 41 is provided with a first accommodating slot 422 and the lens frame 42 is provided with a second accommodating slot 423. The first accommodating slot 422 and the second accommodating slot 423 are provided opposite each other. The reflection mechanism 4 further includes an elastic member 44, one end of the elastic member 44 abuts against the first accommodating slot 422, and the other end of the elastic member 44 abuts against the second accommodating slot 423. In some embodiments, the first accommodating slot 422 and the second accommodating slot 423 are provided relative to each other, which may be understood as an opening of the first accommodating slot 422 is opposite to an opening of the second accommodating slot 423. In some embodiments, an axis of the first accommodating slot 422 may coincide with an axial direction of the second accommodating slot 423. The elastic member 44 plays a resetting and buffering role and may improve stability during adjustment, and the two ends of the elastic member 44 are provided in the first accommodating slot 422 and the second accommodating slot 423, which may shorten the distance between the lens frame 42 and the fixing frame 41, simplify the structure, reduce the space occupancy, reduce the size of the reflection mechanism 4, and improve the compactness of the reflection mechanism 4. In addition, the first accommodating slot 422 and the second accommodating slot 423 accommodating the elastic member 44 are not only to protect the elastic member 44, but also to limit a deformation of the elastic member 44.

In some embodiments, there are a plurality of first accommodating slots 422, a plurality of second accommodating slots 423, and a plurality of elastic members 44. The plurality of first accommodating slots 422 correspond to the plurality of second accommodating slots 423 respectively, and the plurality of elastic members 44 correspond to the plurality of first accommodating slots 422 respectively. In some embodiments, the plurality of second accommodating slots 423 may be provided at the periphery of the mounting through-hole 426. In some embodiments, the plurality of second accommodating slots 423 may be provided at equal intervals around the periphery of the mounting through-hole 426.

In some embodiments, as shown in FIG. 5 and FIG. 7, the elastic member 44 is a spring, which is readily available, reduces cost, and further simplifies the structure. In other embodiments, the elastic member 44 may also be a rubber ring or a torsion spring, etc. In some embodiments, the plurality of elastic members 44 may be provided in a circumferential direction along the periphery of the reflecting minor 45, to ensure the resetting effect of the lens frame 42. In some embodiments, four springs is provided. The count of first accommodating slots 422 and second accommodating slots 423 may also be set to four correspondingly.

In some embodiments, the spring may always be in a compressed state and the fixing frame 41 is connected to the lens frame 42 by an adjusting bolt 43. The two ends of the spring abut against a bottom surface of the first accommodating slot 422 and a bottom surface of the second accommodating slot 423.

In some embodiments, a first fixing member may be provided in the first accommodating slot 422 and a second fixing member may be provided in the second accommodating slot 423, one end of the elastic member 44 is fixed to the first accommodating slot 422 by the first fixing member, and the other end of the elastic member 44 is fixed to the second accommodating slot 423 by the second fixing member. An arrangement of the first fixing member and the second fixing member allows the elastic member 44 to be stably fixed between the first accommodating slot 422 and the second accommodating slot 423. In some embodiments, the first securing member and the second securing member may be adhesive layers. In other embodiments, the first fixing member may be a first fixing rod provided in the first accommodating slot 422, the second fixing member may be a second fixing rod provided in the second accommodating slot 423, and the end of the spring may be sleeved to the first fixing rod and the second fixing bar, respectively.

In some embodiments, the fixing frame 41 includes the housing, the housing is provided with an incidence hole 411 and an emergence hole 412. The imaging optical path is incident from the incidence hole 411 to the reflecting mirror 45, and is reflected by the reflecting mirror and then emitted through the emergence hole 412 to reach the camera 5. In some embodiments, the housing is in a triangular prism shape, where the incident hole 411 and the emergence hole 412 are located on two side surfaces of the triangular prism, and the reflecting mirror 45 is connected to the other side surface of the triangular prism. By providing the housing of the triangular prism, the fixing frame 41 may be stably fixed and small space is occupied, which makes the structure of the microscopic imaging device compact.

In some embodiments, the fixing frame 41 is a triangular prism with a right-angled triangular cross-section, the incidence hole 411 are opened on a first sidewall corresponding to one of the right-angled edges, and the emergence holes 412 are opened on a second sidewall corresponding to the other right-angled edge. In some embodiments, an axis of the incoming aperture 411 and an axis of the outgoing aperture 412 may intersect on the third sidewall corresponding to a diagonal edge, and the incoming aperture 411 and the outgoing aperture 412 are interconnected. In some embodiments, a third sidewall is provided with a through-hole for the light of the imaging optical path passing. In some embodiments, the lens frame 42 mounting through-hole 426 may be provided in correspondence with the through-hole in the third sidewall to allow light entering through the incoming aperture 411 to illuminate the reflecting mirror 45 mounted within the mounting through-hole 426. The adjusting assembly may adjust the angle of the reflecting mirror 45 relative to the fixing frame by adjusting the angle between the lens frame 42 and the third sidewall. In some embodiments, the angle between the third sidewall and a vertical plane (which may also be understood as an angle between the light rays emitted into the reflecting mirror 45 and the third sidewall) may be within a range from 43° to 47°. In some embodiments, an angle between the third sidewall and the vertical plane is 45°. In some other embodiments, an angle between the third sidewall and the vertical plane may be 30°, 60°, 75°, and so forth. The angle between the third sidewall and the vertical plane may be adaptively changed according to actual angular needs. For example, the angle between the third sidewall and the vertical plane is adjusted according to the relative position of the lens 3 and the camera 5, such that the light of the imaging optical path passes through the lens 3 and incident into the camera 5.

In some embodiments, the fixing frame 41 is provided with a mounting portion that may fix the reflection mechanism 4 to the microscopic imaging device (e.g., a base of the microscopic imaging device), and the mounting portion is provided to facilitate mounting of the reflection mechanism 4 to the microscopic imaging device. In some embodiments, the mounting portion may include mounting screw holes and bolts through which the reflection mechanism 4 may be mounted on the microscopic imaging device. In some other embodiments, the mounting portion may include a structure such as a snap hook or a slot that fixes the reflection mechanism 4 to the microscopic imaging device by means of a snap fit. It may be understood that the reflection mechanism 4 and the microscopic imaging device (e.g., a base of the microscopic imaging device) may be in other matching relationships.

The embodiments of the present disclosure further provide a microscopic imaging process, the microscopic imaging process being applied to a microscopic imaging device of any of the above technical embodiments, the microscopic imaging process 1000 includes the following steps:

In 1001, a target magnification and a focal length of a lens 3 of a microscopic imaging device is obtained.

The target magnification may be understood as the magnification that is expected to be ultimately realized by the microscopic imaging device. A focal length of the lens is the distance from a main point of the lens optical rear to a focal point, which is an important performance index of the lens.

In some embodiments, the target magnification is within a range from 1 time to 20 times. In some embodiments, the target magnification is within a range from 1 time to 10 times. In some embodiments, the target magnification is within a range from 1 time to 5 times. It may be understood that the greater the target magnification, the longer the imaging optical path, and the larger the size of the microscopic imaging device.

In some embodiments, the target magnification may be input into the microscopic imaging device by an operator of the microscopic imaging device, e.g., through an input assembly into the microscopic imaging device. In some embodiments, the focal length of the lens 3 of the microscopic imaging device may be input into the microscopic imaging device by an operator of the microscopic imaging device, e.g., through the input assembly into the microscopic imaging device.

In some embodiments, the microscopic imaging device may automatically obtain a target magnification. In some embodiments, obtaining the target magnification includes: obtaining the sample to be observed and a cell diameter of the sample, and determining the target magnification based on the cell diameter.

In some embodiments, the controller may determine a cell diameter of the sample based on a cell type of the sample and determine a target magnification based on that cell diameter. In some embodiments, the controller may include a storage unit. In some embodiments, the storage unit stores cell diameters corresponding to different cell types to enable the controller to determine the cell diameter of the sample based on a cell type of the sample. In some embodiments, the storage unit stores target magnification ratios corresponding to different ranges of cell diameters. Merely by way of example, the target magnification corresponding to the cell diameters may be set as follows: when a cell diameter are less than or equal to 8 um (e.g., the target magnification is large, for example, the target magnification may be greater than 5 times and less than 10 times. When a cell diameter are greater than 8 um (e.g., the target magnification may be smaller, for example, the target magnification may be less than 5 times. Understandably, the storage unit may also directly store the target magnification corresponding to different cell types.

In some embodiments, the sample carrier (e.g., a sample slide) may be provided with an identification (e.g., a number, a two-dimensional code, a symbol, a rod code, etc.), which may correspond to target magnification information of the sample. The controller may be signal-connected to the lens 3, and the lens 3 may scan the identification and cause the controller to obtain the target magnification information of the corresponding sample.

In 1002, an object-image distance, an object distance, and an image distance are determined based on the target magnification and the focal length.

In some embodiments, the determining the object distance, the object distance, and the image distance based on the target magnification and the focal length includes: determining the object distance, the object distance, and the image distance based on the target magnification and the focal length using the following equation: $1/f=1/u+1/v$, $m=v/u$, and $d=u+v$; where f is the focal length, m is the target magnification; v is the image distance; u is the object distance; and d is the object distance. In some embodiments, an object distance may be within a range of 5 mm to 40 mm. In some embodiments, an object distance may be within a range of 10 mm to 25 mm. In some embodiments, an image distance may be within a range of 10 mm to 180 mm. In some embodiments, an image distance may be within a range of 20 mm to 160 mm.

Merely as way of example, a focal length f of the lens 3 is 10.2 mm, according to the above formula, the theoretical values may be obtained: when a target magnification is 4.6, an object-image distance d may be obtained as 69.54 mm approximated as 70 mm, then an object distance u is 12.5 mm and the image distance v is 57.5 mm. When a target magnification is 6.6, an object-image distance d may be obtained as 89.26 mm approximated as 90 mm, then an object distance u is 11.8 mm, an image distance v is 77.88 mm. When a target magnification is 8.6, an object-image distance d is 109.3 mm, which is approximated as 110 mm, then an object distance u is 11.45 mm, an image distance v is 98.47 mm.

In some embodiments, when a target magnification is determined, since the lens 3 is cylindrical and the center axis of the lens 3 extends along the imaging optical path, in actual operation, it is possible to measure a first distance L1 between the lens of the end of the lens 3 facing the sample and the sample, and a second distance L2 between the lens of the end of the lens 3 facing the camera 5 and the camera 5. Since a certain distance still exists between the ends of the lens 3, after obtaining the microscopic imaging device at the target magnification and the focal length of the lens 3, the microscopic imaging device may be tested to determine the first distance L1 and the second distance L2 at the target magnification, and at least based on the two sets of data of the first distance L1 and the second distance L2, a functional relationship between the first distance L1 and the second distance L2 is fitted, which facilitates the practical use of the microscopic imaging device. In some embodiments, a focal length f of the lens 3 is 10.2 mm, and when a target magnification is 4.6, a first distance L1 obtained by fitting is 8.35 mm and a second distance L2 is 52.59 mm. In some embodiments, when a target magnification is 6.6, a first distance L1 obtained by fitting is 7.67 mm and a second distance L2 is 73.26 mm. In some embodiments, when a target magnification is 8.6, a first distance L1 of 7.32 mm and a second distance L2 of 93.61 mm are obtained by fitting.

Similarly, in testing the microscopic imaging device at a target magnification, in order to obtain a functional relationship between the actual value of an object distance d and the target magnification, at least two sets of data of the target magnification and the actual value of the object distance d may be fitted to obtain a functional relationship between the target magnification and the actual value of the object distance d, which facilitates the practical use of the microscopic imaging device.

In 1003, a camera 5 and/or a carrier table 2 along an imaging optical path is moved based on the object-image distance to determine a location of the camera 5 and/or a location of the carrier table 5.

In some embodiments, moving the camera 5 and/or the carrier table 2 along the imaging optical path may be performed by the operator of the microscopic imaging device by adjusting manually the location of the camera 5 and/or the location of the carrier table 2 based on the object distance. In some embodiments, moving the camera 5 along the imaging optical path may be performed by the controller by controlling the camera driving member 51 to automatically adjust the location of the camera 5 to cause the camera driving member 51 to drive the camera 5 along the imaging optical path to a location that satisfies the object distance requirement. In some embodiments, moving the carrier table 2 along the imaging optical path may be performed by the controller by controlling the carrier table driving member 21 to automatically adjust the location of the carrier table 2 to cause the carrier table driving member 21 to drive the carrier table 2 to move along the imaging optical path to a location that satisfies the object distance requirement.

In 1004, the lens 3 is moved along the imaging optical path based on the object distance and the image distance to determine a location of the lens 3.

In some embodiments, moving the lens 3 along the imaging optical path may be performed by the operator of the microscopic imaging device by manually adjusting the location of the lens 3 based on the object-image distances. In some embodiments, moving the lens 3 along the imaging optical path may be performed by the controller by controlling the lens driving member 31 to automatically adjust the location of the lens 3 to cause the lens driving member 31 to drive the lens 3 to move along the imaging optical path to a location that satisfies the object distance and the image distance requirements.

In 1005, an microscopic image of a sample is obtained by photographing the sample through an imaging assembly.

In some embodiments, various parameters of the sample may be obtained based on the microscopic image. In some embodiments, different parameters may be obtained at different magnifications. In some embodiments, the target magnification includes a first magnification and a second magnification, wherein the first magnification is less than the second magnification. The operation 1005 may include the steps of obtaining, based on the first magnification, a first microscopic image of the sample; obtaining, based on the second magnification, a second microscopic image of the sample; determining, based on the first microscopic image, a first parameter of the sample; and determining, based on the second microscopic image, a second parameter of the sample.

In some embodiments, the first parameter may include a cell count and/or a cell concentration. In some embodiments, the second parameter includes a cell viability. If the cell viability and the cell concentration are calculated and analyzed at the same magnification, the results are prone to bias. If the magnification is small, a staining of a dead cell and a staining of an alive cell may be difficult to distinguish, thereby affecting the judgment of dead and alive cells. Similarly, if the cell concentration is analyzed at a high magnification, there is often a large deviation in the cell concentration results obtained from different fields of view due to human sampling bias and systematic bias, etc., and the observation field of view at high magnification is small.

In some embodiments, when the cell concentration and the cell viability is detected by using the microscopic imaging device provided in this embodiment, an operator inputs a first magnification and a second magnification through an input assembly (e.g., a display operating screen), and the first magnification is less than the second magnification. In some embodiments, an experiment type corresponding to the first magnification may be input as a concentration assay and an experiment type corresponding to the second magnification may be input as a viability assay through the input assembly. Subsequently, the first microscopic image of the sample may be obtained by using the first magnification to detect the cell concentration, and then transformed to a second magnification to obtain a second microscopic image of the sample to detect the cell viability. The field of view is changed, the operation as above is repeated several times, and the average value is taken to calculate the cell concentration and the cell viability, respectively. In some embodiments, the first microscopic images of the sample under a plurality of fields of view may also be obtained at the same time under a first magnification, the cell concentration is detected, and the average value is determined, and then the second microscopic image of the sample under a plurality of fields of view is obtained at the same time under a second magnification, the cell activity rate is detected, and the average value is determined.

In some embodiments, the first parameter may include a cell confluence value, a cell apposition rate, and the like. The cell confluence value may be understood as a ratio of an area of the surface of a 2D culture that is covered by cells to a surface area of the 2D culture. A cell apposition rate may be understood as a ratio between a count of cells growing against a wall and a total count of cells. In some embodiments, the second parameter may include a cell diameter, a cell surface area, a cell roundness, and the like.

The accuracy of the determined parameter(s) may be improved by obtaining microscopic images (e.g., the first microscopic image and the second microscopic image) at different magnifications (e.g., the first magnification and the second magnification), respectively, and then determining different parameters (e.g., the first parameter and the second parameter) based on the different microscopic images.

According to the microscopic imaging process 1000 of the present disclosure, a magnification adjustment of the microscopic imaging device is performed, and the sample is photographed and imaged, and the sample may be well observed after photographing and imaging the sample because the process of adjusting the magnification make the range of magnification adjustment relatively large.

It should be noted that the above descriptions of the process 1000 is merely provided for the purpose of example and illustration, and does not limit the scope of application of the present disclosure. For those skilled in the art, various amendments and variations of the process 1000 may be made under the teachings of the present disclosure. However, these amendments and variations remain within the scope of the present disclosure. For example, an order of execution of 1003 and 1004 may be transformed or the two operations may be alternated simultaneously.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Meanwhile, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment," or "one embodiment," or "an alternative embodiment" in various portions of this specification are not necessarily all referring to the same embodiment. Furthermore, the particular features, structures, or feature may be combined as suitable in one or more embodiments of the present disclosure.

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be noted that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term “about,” “approximate,” or “substantially.” For example, “about,” “approximate,” or “substantially” may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized according to the teachings herein. Accordingly, embodiments of the present application are not limited to that precisely as shown and described.

What is claimed is:

1. A microscopic imaging device, comprising:
- a carrier assembly including a carrier table, the carrier table being configured to support a sample to be observed;
- an imaging assembly configured to obtain a microscopic image of the sample by photographing the sample, wherein
  - the imaging assembly includes a camera unit and a lens unit, the camera unit at least includes a camera, and the lens unit at least includes a lens,
  - the camera and/or the carrier table are capable of adjusting an object-image distance by moving along an imaging optical path of the imaging assembly, and
  - the lens is capable of adjusting an object distance and an image distance by moving along the imaging optical path, wherein the camera, the carrier table, and the lens are capable of moving simultaneously to adjust the object-image distance, the object distance, and the image distance;
- a reflection mechanism including a reflecting mirror, the reflecting mirror being configured to change an irradiation direction of light in the imaging optical path between the lens and the camera,
- a gantry, wherein the reflection mechanism, the camera unit, and the lens unit are provided on the gantry, wherein
  - the reflection mechanism further includes a fixing frame and an adjusting assembly,
  - the fixing frame is fixed to the gantry,
  - the reflecting mirror is mounted on the fixing frame through the adjusting assembly, and
  - the adjusting assembly is capable of adjusting an angle of the reflecting mirror relative to the fixing frame; and
- a lens frame, wherein
  - the lens frame includes a frame body,
  - the reflecting mirror is mounted on the frame body,
  - the adjusting assembly is connected to the lens frame and the fixing frame,
  - the adjusting assembly is configured to adjust a relative angle between the lens frame and the fixing frame,
  - the adjusting assembly includes an adjusting through-hole, a threaded hole, and an adjusting bolt,
  - the adjusting through-hole is provided on the lens frame,
  - the threaded hole is provided on the fixing frame, and
  - the adjusting bolt is capable of passing through the adjusting through-hole and being connected to the threaded hole.

2. The microscopic imaging device of claim 1, wherein
- the camera unit further includes a camera driving member configured to drive the camera to move along the imaging optical path;
- the lens unit further includes a lens driving member configured to drive the lens to move along the imaging optical path; and/or
- the carrier assembly further includes a first carrier table driving member configured to drive the carrier table to move along the imaging optical path.

3. The microscopic imaging device of claim 2, further comprising a controller, wherein
- the controller is connected to the camera driving member through a signal, and the controller is configured to control the camera driving member to drive the camera to move;
- the controller is connected to the lens driving member through the signal, and the controller is configured to control the lens driving member to drive the lens to move; and/or
- the controller is connected to the first carrier table driving member through the signal, and the controller is configured to control the first carrier table driving member to drive the carrier table to move.

4. The microscopic imaging device of claim 3, further comprising:
- an input assembly connected to the controller through the signal, the input assembly being configured to input a target magnification.

5. The microscopic imaging device of claim 1, further comprising:
- a light source configured to irradiate the sample, an optical path of light emitted from the light source forming the imaging optical path.

6. The microscopic imaging device of claim 1, wherein
- the fixing frame includes a housing,
- the reflecting mirror is connected to the housing,
- the housing is provided with an incidence hole and an emergence hole,
- the imaging optical path is incident to the reflecting mirror from the incidence hole,
- the imaging optical path is reflected by the reflecting mirror, and the reflected imaging optical path is emitted from the emergence hole to reach the camera.

7. The microscopic imaging device of claim 6, wherein the camera unit further includes a light shielding box, the camera is provided in the light shielding box, a camera driving member is provided in the light shielding box, the light shielding box is provided with a light-through-hole, the fixing frame is connected to an outer wall of the light shielding box, and the imaging optical path is reflected by the reflecting mirror and reaches the camera through the emergence hole and the light-through-hole in sequence.

8. The microscopic imaging device of claim 1, wherein the lens frame further includes:

a mounting through-hole provided on the frame body;

an abutting portion provided on an inner wall of the mounting through-hole; and a compressing member connected to the frame body, the reflecting mirror being fixed between the compressing member and the abutting portion.

9. The microscopic imaging device of claim 1, wherein the fixing frame is provided with a first accommodating slot, the lens frame is provided with a second accommodating slot, the first accommodating slot is arranged opposite to the second accommodating slot, the reflection mechanism further includes an elastic member, and an end of the elastic member abuts against the first accommodating slot, and another end of the elastic member abuts against the second accommodating slot.

10. The microscopic imaging device of claim 1, wherein the adjusting assembly further includes a reflecting mirror driving member configured to drive the reflecting mirror to rotate relative to the fixing frame; the reflecting mirror driving member is connected to a controller through a signal, and the controller is configured to perform operations, including:

controlling the imaging assembly to obtain at least one test image;

determining, based on the at least one test image, one or more test parameters, the one or more test parameters being configured to reflect imaging quality of the at least one test image;

determining, based on the one or more test parameters, a preset rotation direction of the reflecting mirror and a preset rotation angle of the reflecting mirror; and controlling the reflecting mirror driving member to drive the reflecting mirror to rotate based on the preset rotation direction and the preset rotation angle.

11. A microscopic imaging method, applied to a microscopic imaging device, the microscopic imaging device comprising:

a carrier assembly including a carrier table, the carrier table being configured to support a sample to be observed; and an imaging assembly configured to obtain a microscopic image of the sample by photographing the sample, wherein the imaging assembly includes a camera unit and a lens unit, the camera unit at least includes a camera, and the lens unit at least includes a lens, the camera and/or the carrier table are capable of adjusting an object-image distance by moving along an imaging optical path of the imaging assembly, and the lens is capable of adjusting an object distance and an image distance by moving along the imaging optical path; and the microscopic imaging method comprising:

obtaining a target magnification and a focal length of the lens of the microscopic imaging device;

determining, based on the target magnification and the focal length, the object-image distance, the object distance, and the image distance;

moving, based on the object-image distance, the camera and/or the carrier table along the imaging optical path to determine a location of the camera and/or a location of the carrier table;

moving, based on the object distance and image distance, the lens along the imaging optical path to determine a location of the lens; and obtaining the microscopic image of the sample by photographing the sample through the imaging assembly.

12. The microscopic imaging method of claim 11, wherein the determining, based on the target magnification and the focal length, the object-image distance, the object distance and the image distance includes:

determining, based on the target magnification and the focal length, the object-image distance, the object distance, and the image distance using equations of $1/f=1/u+1/v$, $m=v/u$, and $d=u+v$, where f is the focal length, m is the target magnification, v is the image distance, u is the object distance, and d is the object-image distance.

13. The microscopic imaging method of claim 11, wherein the obtaining the target magnification includes:

obtaining the sample to be observed and a cell diameter of the sample; and determining the target magnification based on the cell diameter.

14. The microscopic imaging method of claim 11, wherein the target magnification includes a first magnification and a second magnification, the first magnification is less than the second magnification, and the obtaining the microscopic image of the sample by photographing the sample through the imaging assembly includes:

obtaining, based on the first magnification, a first microscopic image of the sample;

obtaining, based on the second magnification, a second microscopic image of the sample;

determining, based on the first microscopic image, a first parameter of the sample; and determining, based on the second microscopic image, a second parameter of the sample.

15. A reflection mechanism of a microscopic imaging device, comprising:

a fixing frame;

a lens frame including a frame body, the frame body being configured to install a reflecting mirror; and an adjusting assembly connected to the lens frame and the fixing frame, the adjusting assembly being configured to adjust a relative location between the lens frame and the fixing frame, thereby adjusting a relative angle between the reflecting mirror and the fixing frame, wherein the adjusting assembly includes an adjusting through-hole, a threaded hole, and an adjusting bolt; the adjusting through-hole is provided on the lens frame, the threaded hole is provided on the fixing frame, and the adjusting bolt is capable of passing through the adjusting through-hole and being connected to the threaded hole.

* * * * *